United States Patent
Zhitomirsky

(10) Patent No.: US 8,710,827 B2
(45) Date of Patent: Apr. 29, 2014

(54) PROCESSING CIRCUITRY FOR USE WITH A POSITION SENSOR

(75) Inventor: Victor Evgenievich Zhitomirsky, Cambridge (GB)

(73) Assignee: Sagentia Limited, Cambridge (GB)

(*) Notice: Subject to any disclaimer, the term of this patent is extended or adjusted under 35 U.S.C. 154(b) by 643 days.

(21) Appl. No.: 12/933,203

(22) PCT Filed: Mar. 19, 2008

(86) PCT No.: PCT/GB2008/000981
§ 371 (c)(1),
(2), (4) Date: Jan. 10, 2011

(87) PCT Pub. No.: WO2009/115764
PCT Pub. Date: Sep. 24, 2009

(65) Prior Publication Data
US 2011/0109303 A1    May 12, 2011

(51) Int. Cl.
*G01B 7/14* (2006.01)

(52) U.S. Cl.
USPC ................ 324/207.17; 324/207.24

(58) Field of Classification Search
USPC ........... 324/173–174, 207.24, 207.12–207.17
See application file for complete search history.

(56) References Cited

U.S. PATENT DOCUMENTS

| 3,331,045 | A | 7/1967 | Weiss et al. |
| 4,737,698 | A | 4/1988 | McMullin et al. |
| 4,774,465 | A | 9/1988 | Nilius |
| 4,950,988 | A | 8/1990 | Garshelis |
| 5,003,260 | A | 3/1991 | Auchterlonie |
| 5,204,621 | A | 4/1993 | Hermann et al. |
| 5,280,239 | A | 1/1994 | Klimovitsky et al. |
| 5,604,621 | A | 2/1997 | Fujikane |
| 5,617,023 | A | 4/1997 | Skalski |
| 5,781,006 | A | 7/1998 | Beichler |
| 6,118,271 | A | 9/2000 | Ely et al. |
| 6,222,360 | B1 | 4/2001 | Tischer et al. |

(Continued)

FOREIGN PATENT DOCUMENTS

| DE | 3914787 | 11/1990 |
| DE | 4311973 | 2/1997 |

(Continued)

OTHER PUBLICATIONS

International Report on Patentability for related International Application No. PCT/GB2005/000775, issued Sep. 6, 2006.

(Continued)

*Primary Examiner* — Jay Patidar
(74) *Attorney, Agent, or Firm* — Venable LLP; Michele V. Frank

(57) ABSTRACT

A position encoder is described that generates a signal whose phase varies with a position to be determined. A phase detector determines a first phase measurement of the sensor signal during a first mode and a second phase measurement of said sensor signal during a second mode. The phase detector then differences the first and second phase measurements to obtain a phase difference measurement, which it uses to determine an indication of the position to be sensed. A controller controls a signal generator in order to set a start phase of signals generated in at least one of the first and second modes so that the timings at which said sensor signal crosses a reference level are substantially the same.

24 Claims, 21 Drawing Sheets

(56) References Cited

U.S. PATENT DOCUMENTS

| | | |
|---|---|---|
| 6,265,867 B1 | 7/2001 | Fowler |
| 6,605,939 B1 | 8/2003 | Jansseune et al. |
| 6,653,828 B2 | 11/2003 | Dordet et al. |
| 6,714,004 B2 | 3/2004 | Jagiella |
| 6,823,731 B1 | 11/2004 | Lin |
| 7,321,229 B2 | 1/2008 | Tapson |
| 7,482,803 B2 | 1/2009 | Lee et al. |
| 2001/0020846 A1* | 9/2001 | Miyata ............... 324/207.17 |
| 2004/0036468 A1 | 2/2004 | Hoffelder et al. |
| 2005/0030010 A1* | 2/2005 | Jones et al. .......... 324/207.24 |
| 2007/0139040 A1* | 6/2007 | Jones et al. .......... 324/207.17 |
| 2007/0194781 A1 | 8/2007 | Zhitomirskiy |

FOREIGN PATENT DOCUMENTS

| | | |
|---|---|---|
| DE | 19621886 | 12/1997 |
| DE | 19919424 | 11/2000 |
| DE | 10250846 | 5/2004 |
| EP | 0191223 | 8/1986 |
| EP | 0417921 | 3/1991 |
| EP | 0896205 | 2/1999 |
| EP | 1048932 | 11/2000 |
| EP | 1736736 | 12/2006 |
| WO | WO-95/31696 | 11/1995 |
| WO | WO-97/14935 | 4/1997 |
| WO | WO-03/038379 | 5/2003 |
| WO | WO-2004/061759 | 7/2004 |
| WO | WO-2005/085763 | 9/2005 |
| WO | WO-2005/111551 | 11/2005 |
| WO | WO-2006/123141 | 11/2006 |

OTHER PUBLICATIONS

Written Opinion and International Search Report for related International Application No. PCT/GB2005/000775, mailed Sep. 6, 2006.

International Search Report and Written Opinion for related International Application No. PCT/GB2008/000981, mailed May 15, 2009.

\* cited by examiner

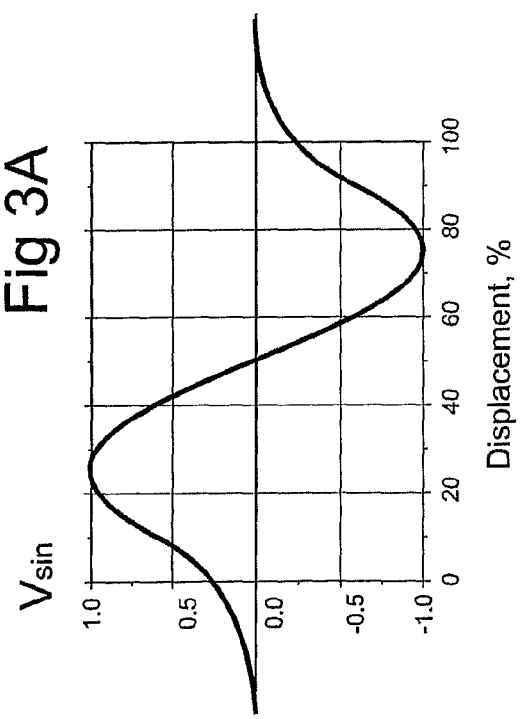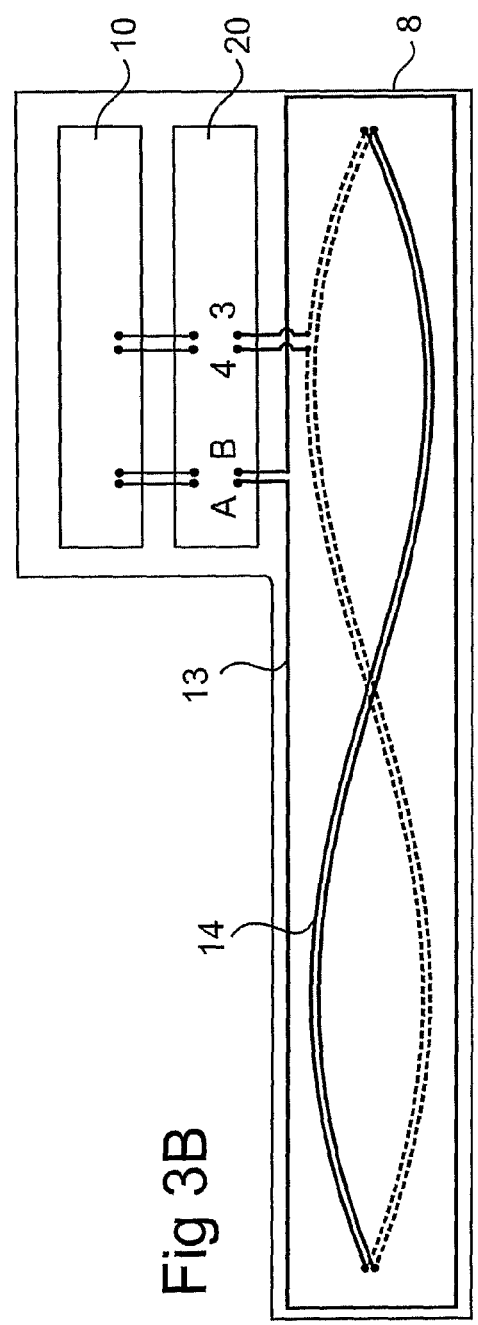

PROCESSING CIRCUITRY FOR USE WITH A POSITION SENSOR

The present invention relates to processing circuitry used in position sensors or encoders. The invention has particular but not exclusive relevance to excitation and detection circuitry that can be used to excite and detect the signals from different types of non-contact rotary or linear position encoders, such as inductive or capacitive based position encoders.

Inductive and capacitive position encoders are well known in the art and typically comprise a movable member, whose position is related to the machine about which position or motion information is desired, and a stationary member which is inductively or capacitively coupled to the moving member. The stationary member typically includes a number of detectors which provide electrical output signals which can be processed to provide an indication of the position, direction, speed and/or acceleration of the movable member and hence for those of the related machine.

There are various different types of such electromagnetic position encoders and they all invariably need processing circuitry to process signals generated by the detectors to determine the desired position information. Existing techniques for processing the detected signals suffer from a number of problems, including that they are sensitive to noise added by the processing electronics themselves.

The present invention aims to provide alternative processing circuits for processing the signals obtained from position detectors to determine the desired position information. The processing circuits described herein can be used with many different types of position detectors, such as the inductive based detectors described in WO95/31696, WO97/14935, WO2005/085763, EP0417921, U.S. Pat. No. 4,737,698 or the capacitive based detectors described in WO2005/111551, WO2006/123141 or U.S. Pat. No. 6,823,731, the contents of which are incorporated herein by reference.

According to one aspect, the present invention provides an apparatus for use with a position sensor, the apparatus comprising: a signal generator operable to generate signals for driving the position sensor so that a cyclically varying sensor signal is obtained from the position sensor whose phase varies with the position to be sensed; a controller operable to control the signal generator to switch between a first mode in which the phase of said sensor signal varies with said position according to a first function and a second mode in which the phase of said sensor signal varies with said position according to a second different function; and a phase detector operable: i) to determine a first phase measurement of said sensor signal during said first mode; ii) to determine a second phase measurement of said sensor signal during said second mode; iii) to difference the first and second phase measurements to obtain a phase difference measurement; and iv) to output an indication of the position to be sensed determined using said phase difference measurement. Preferably, the controller is operable to control said signal generator in order to set a start phase of signals generated in at least one of said first and second modes so that the timings at which said sensor signal crosses said reference level relative to the corresponding start times of said first and second modes are substantially the same. The driving signals may be used as excitation signals for exciting excitation elements of the position sensor and/or for controlling mixers (such as switches) used to process the signals obtained from sensing elements of the position sensor.

In one embodiment, the controller controls the signal generator to switch repeatedly between said first and second modes and the start phase used for a current first mode is based on a phase measurement obtained in a previous first mode and a start phase used for a current second mode is based on a phase measurement obtained in a previous second mode.

The signal generator may generate AC signals or digital signals, for example read out of a read only memory. The signal generator may generate a high frequency signal and a low frequency signal which is used to modulate the high frequency signal. The high frequency signal may be used to excite a target and the sensor signal processed by the apparatus may be based on the low frequency modulating signal.

Preferably, the controller controls the signal generator in order to set a start phase of signals generated in at least one of the first and second modes so that the sensor signal crosses the reference level towards the end of a period in which the signal generator is operating in the first or second modes. This is preferred as this allows the apparatus time to settle to the signals used to drive the position sensor in the corresponding mode. The time between switching between the modes is a measurement interval and the start phases may be chosen so that the sensor signal crosses the reference level just before the end of the corresponding measurement interval. In this case, just before may be between one tenth and one fiftieth of the measurement interval from the end of the corresponding measurement interval.

The phase detector may determine the position to be measured based on the determined phase difference measurement and the respective start phases applied during the first and second modes.

The above apparatus may be provided together with the position sensor, which may be, for example, an inductive or capacitive position sensor. The position sensor may include some processing circuitry, such as mixers, amplifiers, inverters and/or low pass filters. The position sensor may include one or more excitation elements (such as excitation windings or electrodes) and one or more sensing elements (such as sensing windings or sensing electrodes). The excitation elements may be used for exciting a target device and the sensing elements may be used for sensing a signal generated by said target device when excited by said excitation elements. Alternatively, the signal coupled directly between the excitation elements and the sensing elements may be sensed.

These and various other features and aspects of the invention will become apparent from the following detailed description of exemplary embodiments which are described with reference to the accompanying figures in which:

FIG. 1 illustrates the main components of an inductive position sensor used to sense the position of a moveable target relative to a sensor board;

FIG. 2 schematically illustrates the way in which windings carried by the sensor board illustrated in FIG. 1 may be connected to excitation and processing circuitry;

FIG. 3A is a plot illustrating the way in which the peak amplitude of a signal generated in a sin sensor winding (shown in FIG. 3B) varies with the position of the moveable target;

Figure 1:
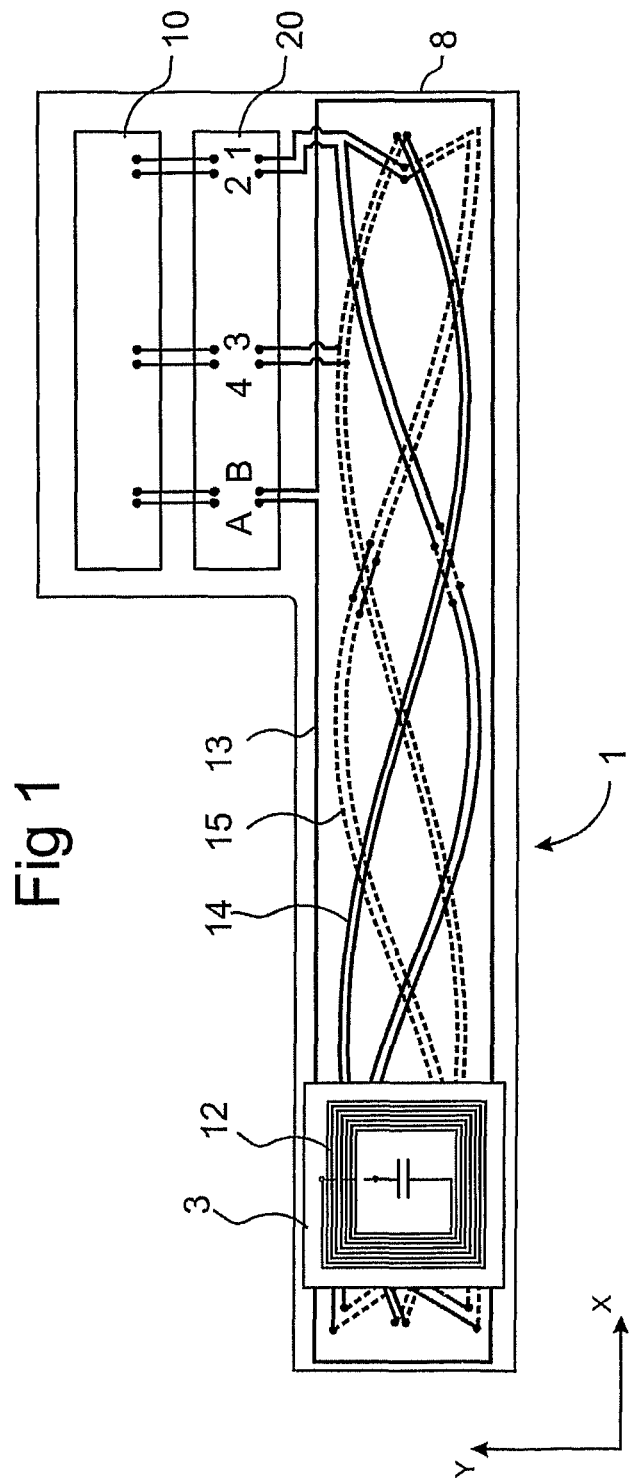
Figure 19:
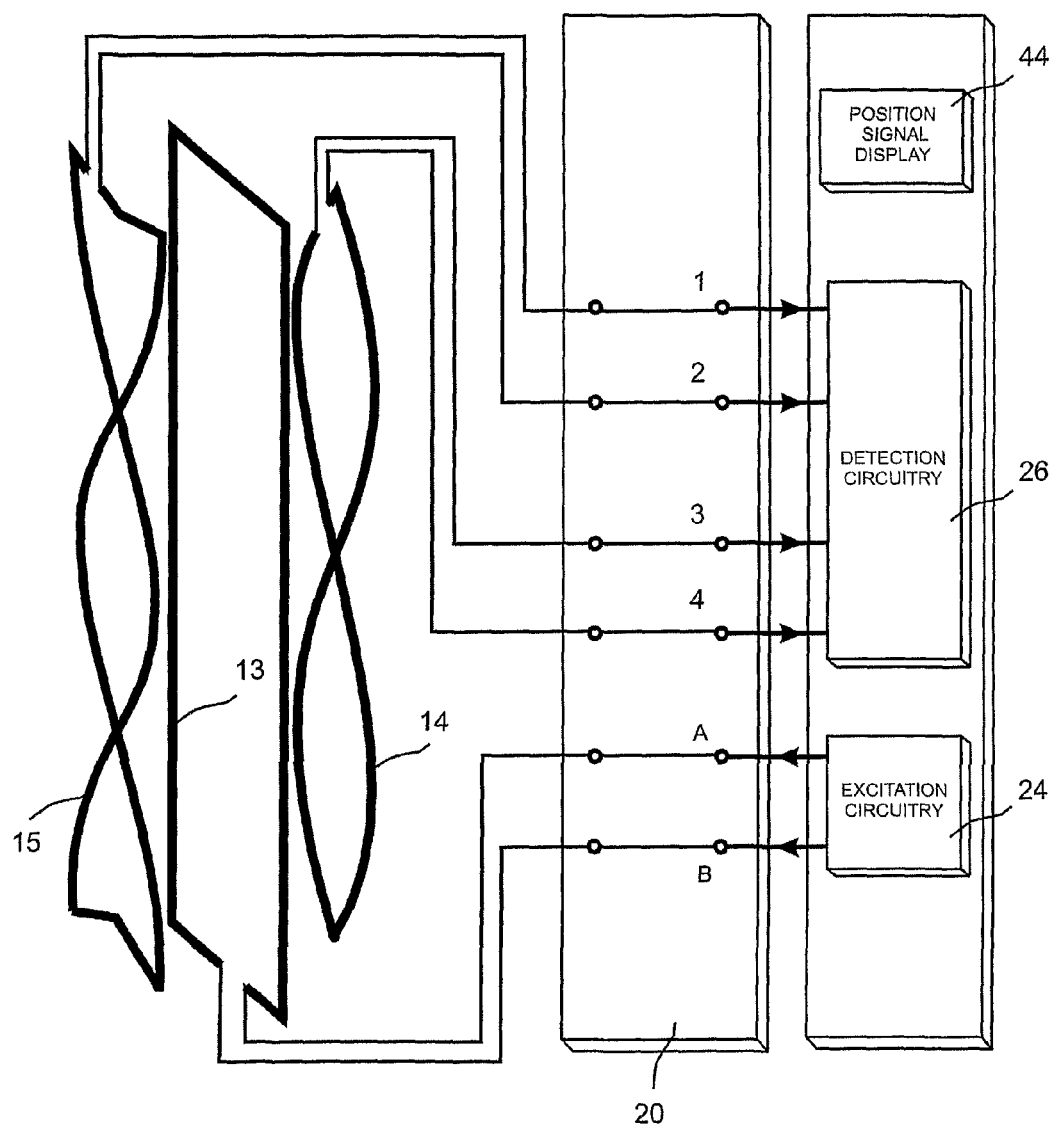
Figure 20:
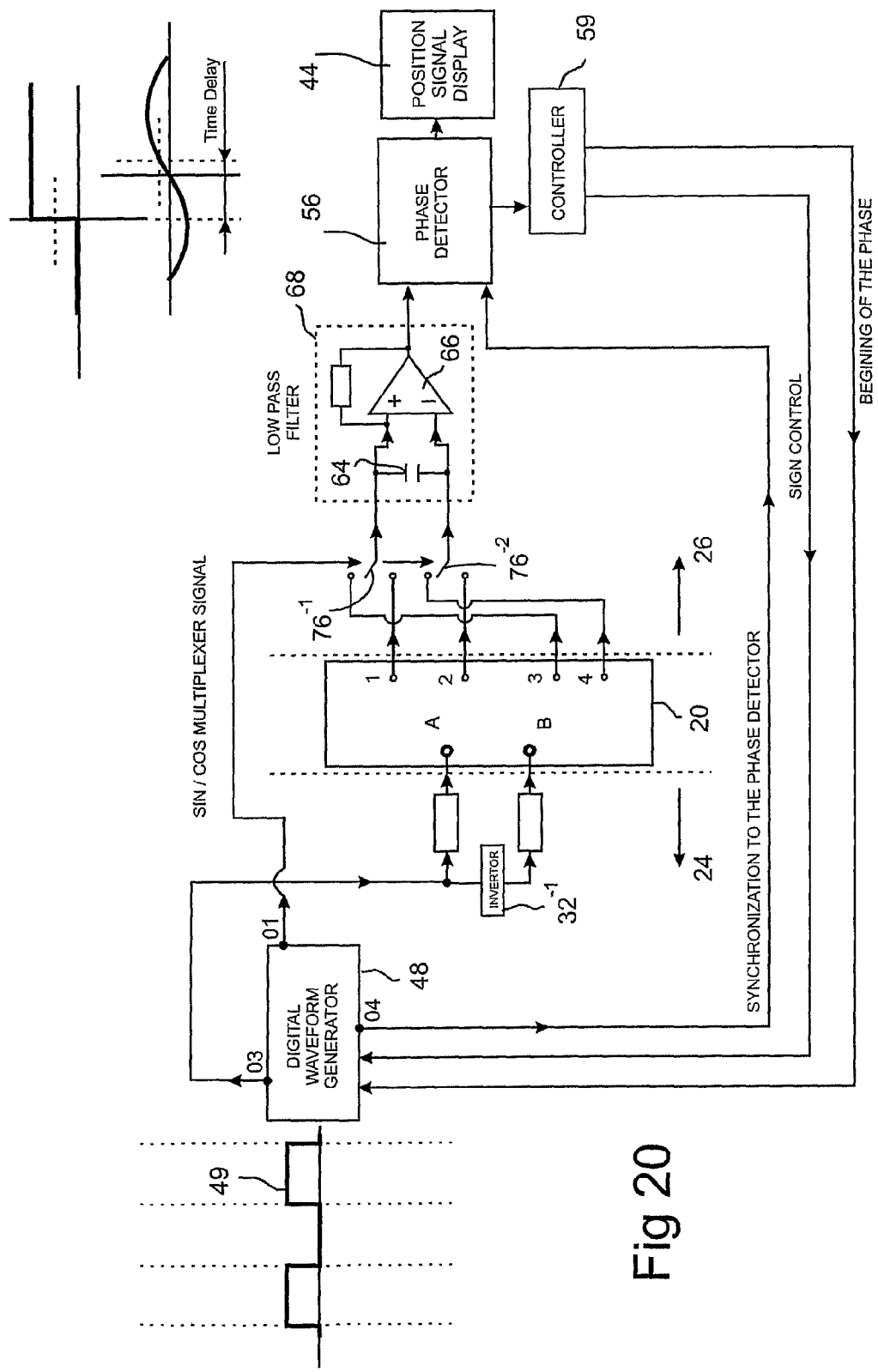
Figure 21:
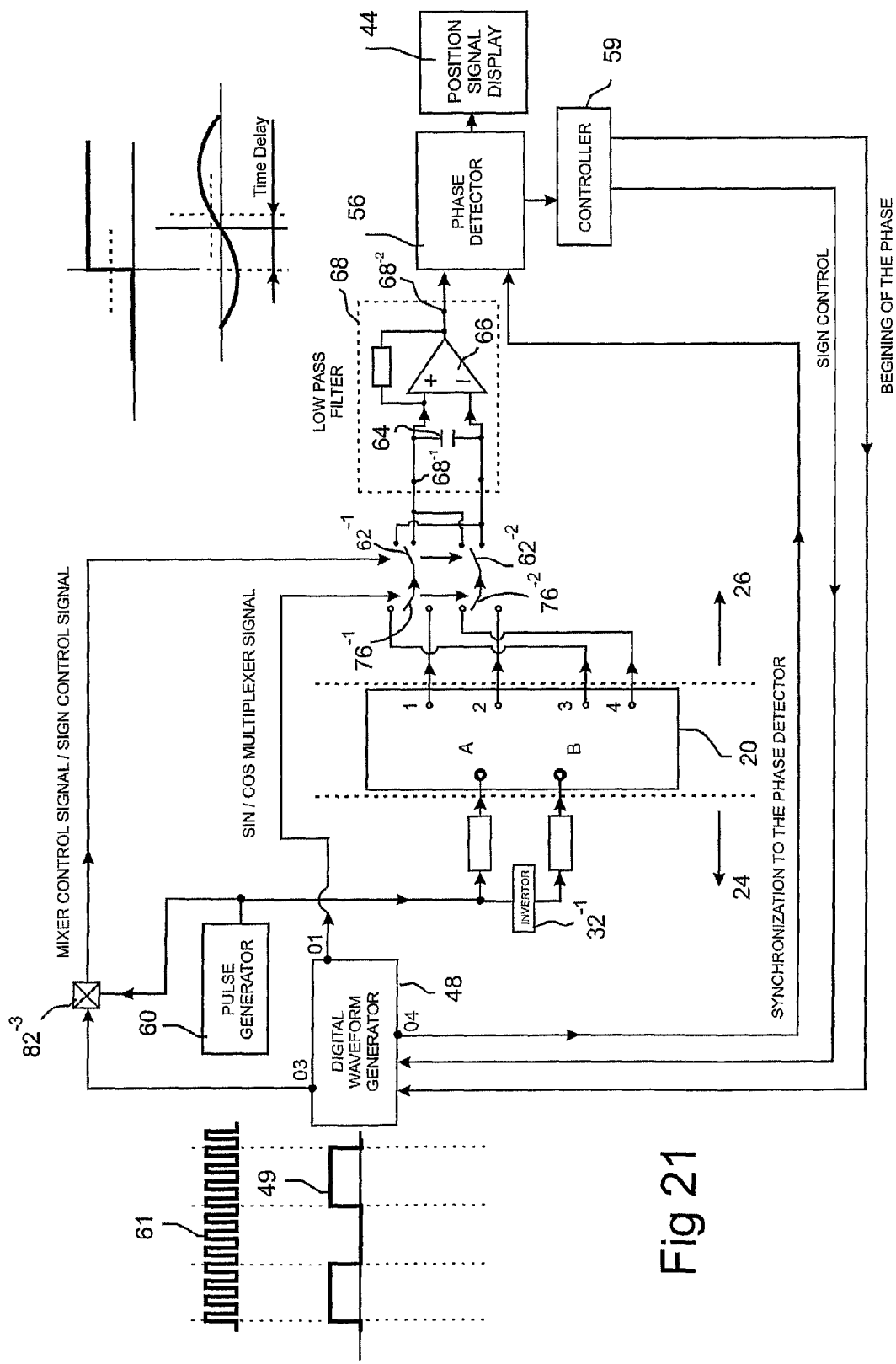

FIG. 19 schematically illustrates an alternative way in which windings carried by the sensor board illustrated in FIG. 1 may be connected to excitation and processing circuitry;

FIG. 20 is a block diagram illustrating the main components of excitation and detection circuitry that can be used with the sensor shown in FIG. 1 when connected in the manner shown in FIG. 19; and FIG. 21 is a block diagram illustrating the main components of alternative excitation and detection circuitry that can be used with the sensor shown in FIG. 1 when connected in the manner shown in FIG. 19.

OVERVIEW

Figure 2:
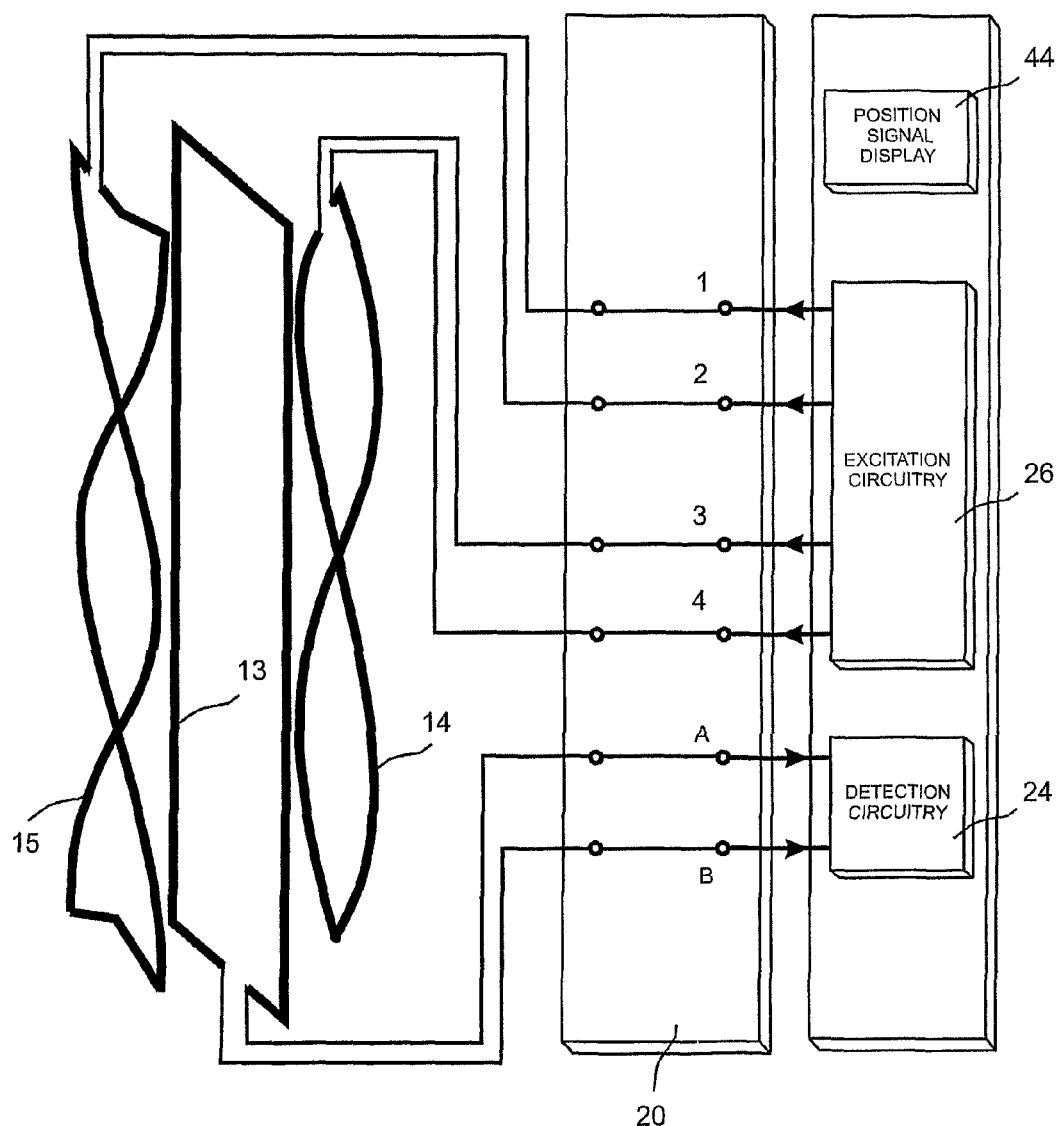

FIG. 1 schematically illustrates an inductive position sensor 1 which is for sensing the position of a moveable target 3. As shown, the sensor 1 includes a circuit board 8 which carries a first, second and third windings 13, 14 and 15 which are connected to excitation and processing circuitry 10 by a connection interface 20. As shown, winding 13 is connected to terminals A and B on the connection interface 20, winding 15 is connected to terminals 1 and 2 on the connection interface 20 and winding 14 is connected to terminals 3 and 4 on the connection interface 20. In this embodiment, the target 3 includes an electromagnetic resonator 12 and, as illustrated in FIG. 2, excitation circuitry 26 applies excitation signals to windings 14 and 15 to cause the resonator 12 to resonate. As shown in FIGS. 1 and 2, the windings 14 and 15 are geometrically patterned along the x-axis (the measurement path) as a result of which, the electromagnetic coupling between the windings 14 and 15 and the resonator 12 varies as a function of position along the x-axis. Therefore, the signal generated by the resonator 12 will vary with position along the x-axis. This resonator signal then couples into the winding 13 and is processed by detection circuitry 24 to determine the position of the target 3 along the x-axis, which is displayed on the display 44.

In this embodiment, the excitation and sensor windings carried by the PCB 8 are geometrically arranged on the PCB 8 so that, in the absence of the target 3, there is substantially no electromagnetic (inductive) coupling between them. In other words, in the absence of the target 3, when an AC excitation current is applied to the excitation windings 14 and 15, substantially no signal is induced in the sensor winding 13. This is not however essential.

Sensor Design

FIG. 1 schematically illustrates the conductor tracks on the sensor PCB 8 that form the sensor winding 13, a "sin" excitation winding 14 and a "cos" excitation winding 15, all of which extend along the length of the PCB 8. The PCB 8 is a two layer PCB, with the conductor tracks on the upper layer (closest to the target 3) being shown in solid lines and with the conductor tracks on the lower layer (furthest from the target 3) being shown in dashed lines. The excitation windings 14 and 15 have a pitch ($L_x$) that approximately corresponds to the range over which the target 3 can move.

As shown, the excitation winding 14 is formed from two turns of conductor that effectively define two sets of loops which are connected together in the opposite sense in a figure of eight configuration. As a result, the magnetic field generated by the first set of loops will be in the opposite direction to the magnetic field generated by the second set of loops. The figure of eight connection also means that EMFs induced in the first set of loops by a common background magnetic field will oppose the EMFs induced in the second set of loops by the same common background magnetic field. As those skilled in the art will appreciate, the excitation winding 15 is effectively formed by shifting the excitation winding 14 by a quarter of the pitch ($L_x$) along the X direction. As shown, the excitation winding 15 effectively defines three sets of loops, with the loops of the first and third sets being wound in the same direction as each other but opposite to the winding direction of the loops of the second (middle) set.

The sensor winding 13 is wound around the outside of the excitation windings 14 and 15 and is arranged so that (in the absence of the target 3) it has a sensitivity to magnetic field which is substantially symmetric along an axis which is parallel to the Y axis and which passes through the middle of the sensor winding 13. This axis of symmetry is also an axis of symmetry for the excitation windings 14 and 15. Therefore, as a result of the figure of eight arrangement of the excitation windings 14 and 15 and as a result of the common symmetry between the sensor winding 13 and the excitation windings 14 and 15, there is minimal direct inductive coupling between the sensor winding 13 and the excitation windings 14 and 15. As a result of the figure of eight configuration of the excitation windings 14 and 15, the coupling between each excitation winding and the resonator is approximately sinusoidal.

FIG. 3A schematically illustrates the way in which the peak amplitude of the signal generated in the sensor winding 13 (shown in FIG. 3B) varies with the position of the target 3, when the excitation winding 14 is energised. As shown, the variation in the peak amplitude is approximately sinusoidal (except at the ends of the winding) and hence the excitation winding 14 is referred to as the "sin" excitation winding 14.

The period of the sinusoidal variation corresponds approximately to the pitch ($L_x$) of the excitation winding 14.

Figure 4A:
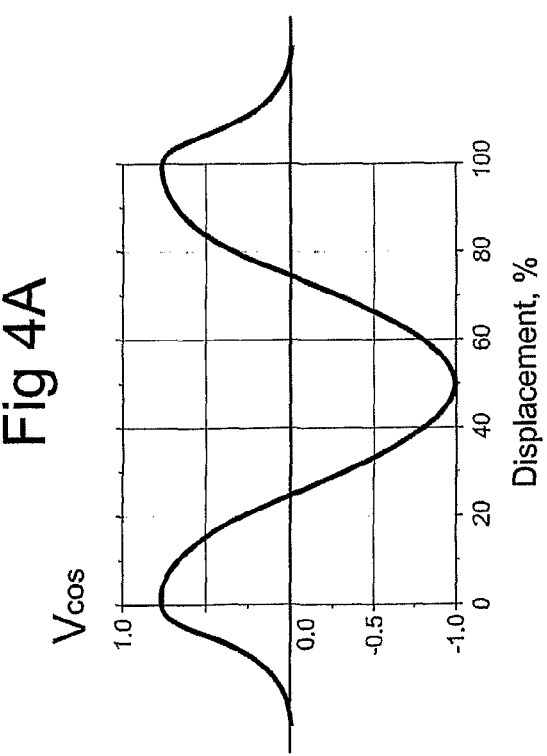
FIG. 4A is a plot illustrating the way in which the peak amplitude of a signal generated in a cos sensor winding (shown in FIG. 4B) varies with the position of the moveable target.
Figure 4B:
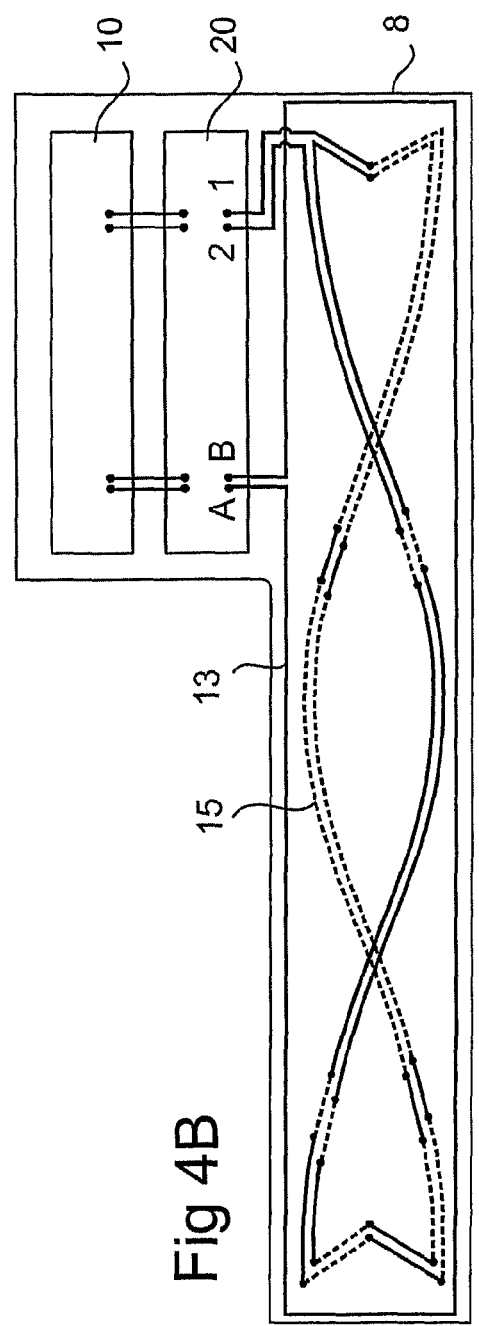

FIG. 4A schematically illustrates the way in which the peak amplitude of the signal induced in the sensor winding 13 (shown in FIG. 4B) varies with the position of the target 3, when the excitation winding 14 is energised. As shown, the variation is in phase quadrature (90° out of phase) to the variation obtained by energising excitation winding 14, which is why the excitation winding 15 is referred to as the "cos" excitation winding.

As those skilled in the art will appreciate, the quadrature nature of the variation between the signals output from the sensor winding 13 is obtained because excitation winding 15 is effectively shifted along the X direction by a quarter of the pitch $L_x$ relative to excitation winding 14.

As those skilled in the art will appreciate, the plots shown in FIGS. 3A and 4A are approximate in that the peak amplitudes of the output signals do not vary exactly sinusoidally with the position of the target 3. This is an approximation to the actual variation, which will depend upon edge effects, positions of via holes on the PCB 8 and other effects that introduce non-linearities into the system.

As those skilled in the art will appreciate, two excitation windings 14 and 15 are provided in this embodiment in order to be able to uniquely encode the position of the target 3 along the entire pitch ($L_x$) of the sensor windings 14 and 15. However, if the measurement range of the target 3 is limited, for example to between the thirty percent and the seventy percent points on the plot shown in FIG. 3A, then only one excitation winding (winding 14) would be required to determine the absolute position of the target 3. However, when the target 3 can move over the entire pitch of the excitation windings 14 and 15, at least two excitation windings are required in order to overcome the phase ambiguity common with sinusoidal signals. For example, if the peak amplitude of the signal generated in the sensor winding 13 as a result of energising excitation winding 14 is determined to be 0.5, then, as shown in FIG. 3A, the position may correspond to approximately ten percent or approximately forty-two percent of the range of movement of the target 3. This ambiguity can be resolved using the peak amplitude of the signal generated as a result of energising the other excitation winding 15.

Figure 5B:
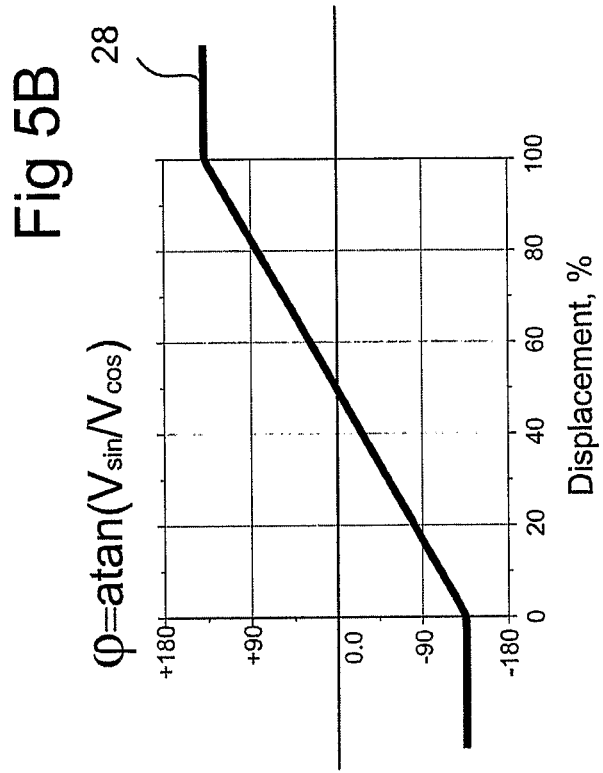
FIG. 5B is a phase plot illustrating the way in which a phase angle obtained from measured sin and cos signals varies with the position of the moveable target.
Figure 5A:
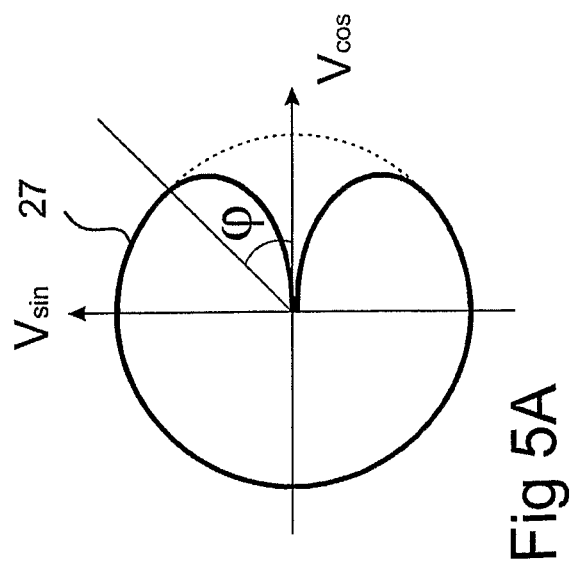
FIG. 5A is a plot illustrating the locus of points obtained by plotting the peak amplitude of the signal induced in the sin sensor winding against the peak amplitude of the signal induced in the cos sensor winding as the moveable target moves from one end of the sensor board to the other end.

FIG. 5A illustrates the locus 27 obtained by plotting the peak amplitude of the EMF induced in the sensor winding 13 as a result of energising excitation winding 14 against the peak amplitude of the EMF induced in the sensor winding 13 as a result of energising excitation winding 15, as the target moves from one end of the sensor board 8 to the other. As shown, the plot 27 is substantially circular except for when the target 3 is at each end of the sensor board 8. Therefore, as shown by plot 28 in FIG. 5B, except in these end regions, the phase angle φ varies linearly with the position of the target 3. Consequently, as will be described in more detail below, the excitation and detection electronics 10 determines the position of the target 3 by determining an arctangent function of the ratio of the peak amplitudes of these signals induced in the sensor winding. The use of such a ratiometric measurement is preferred as it makes the system less sensitive to variations in the amplitude of the excitation current and variations in the distance between the target 3 and the sensor board 8.

Excitation and Detection Circuitry—1

Figure 6:
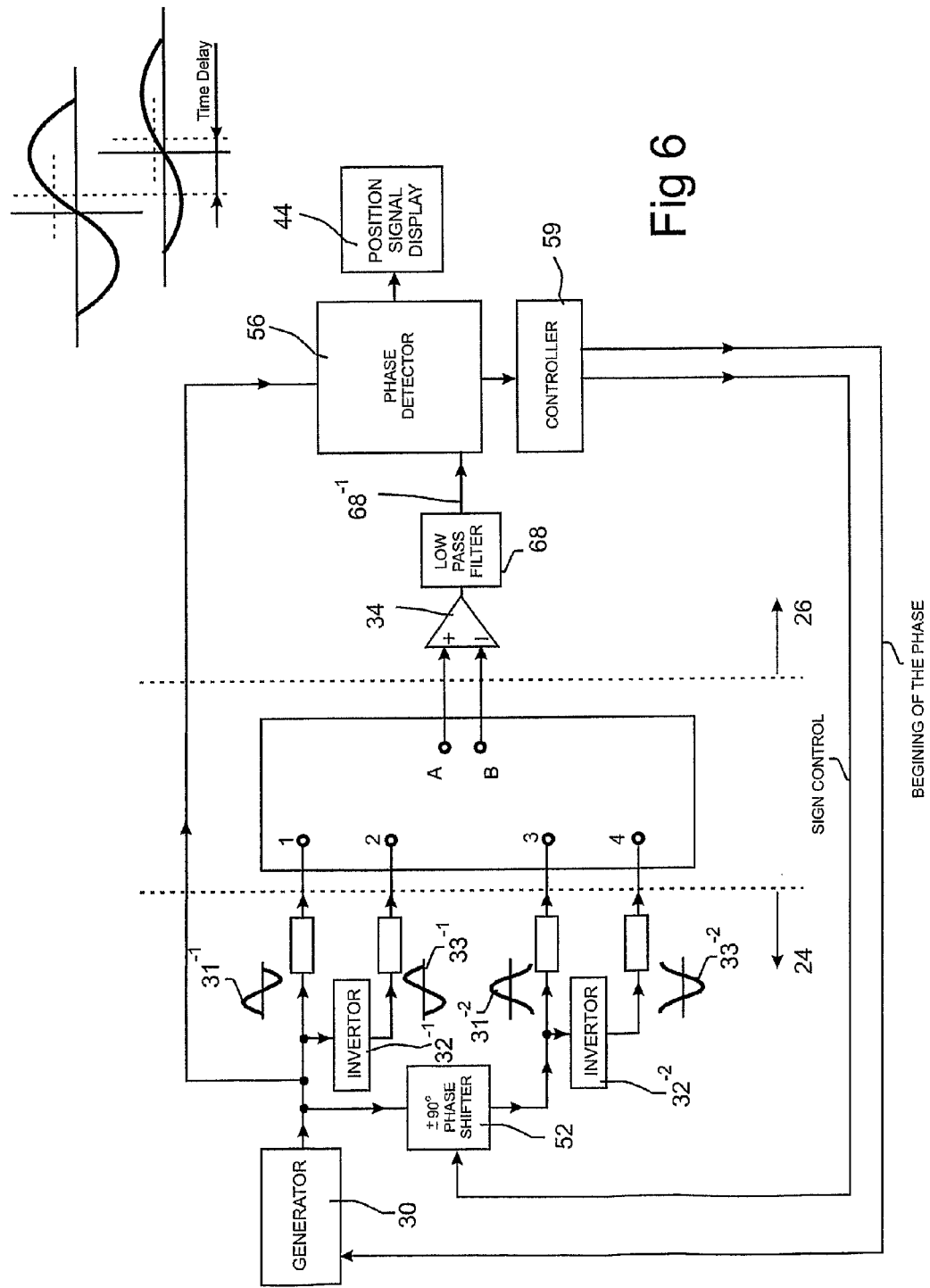
FIG. 6 is a block diagram illustrating the main components of excitation and detection circuitry that can be used with the sensor shown in FIG. 1.

FIG. 6 is a block diagram illustrating one form of the excitation circuitry 24 and the detection circuitry 26 that can be used. As shown, the excitation circuitry 24 includes a signal generator 30 which is operable to generate an AC drive voltage $31^{-1}$ which is applied to terminal 1 of the connection interface 20. The excitation circuitry also includes an inverter $32^{-1}$ which inverts the AC voltage $31^{-1}$ to generate an inverted AC voltage $33^{-1}$, which is applied to terminal 2 of the connection interface 20. As a result, symmetrical sinusoidal excitation signals are applied to both ends of the excitation winding 15. The excitation circuitry also includes a ±90° phase shifter 52 which applies a +90° phase shift or a −90° phase shift to the excitation signal $31^{-1}$ to form phase quadrature excitation signal $31^{-2}$. As shown, this phase quadrature excitation signal $31^{-2}$ is applied to terminal 3 of the connection interface 20 and to inverter $32^{-2}$ which generates an inverted AC excitation signal $33^{-2}$ which is applied to terminal 4 of the connection interface 20. The AC voltages 31 and 33 can have an amplitude in the range 0.1V to 10V and a frequency between 100 Hz and 10 MHz. Although not essential, the inventor has found that by driving both ends of the excitation windings 14 and 15 with symmetrical excitation voltages 31 and 33, the sensor is less sensitive to unwanted capacitive coupling effects.

As shown in FIG. 6, the signals obtained at terminals A and B of the connection interface 20 (which are connected to the sensor winding 13) are applied to a differential amplifier 34 which amplifies the signals obtained from the sensor winding and removes any common mode signals that might arise. The amplified signal is then filtered by a low pass filter 68 to remove high frequency noise above the frequency of the excitation signals. As discussed above, the signals induced in the sensor winding 13 as a result of driving excitation windings 14 and 15 are AC signals at the same frequency as the excitation signal and having a peak amplitude that varies sinusoidally and cosinusoidally with the position of the target 3. Therefore, the signal $64^{-1}$ output by the differential amplifier 34 can be represented (approximated) by the following equations:

$$V_{34} = A\cos\left[\frac{2\pi d}{L_x}\right]\sin 2\pi ft - A\sin\left[\frac{2\pi d}{L_x}\right]\cos 2\pi ft \quad (1)$$

which can be rewritten as:

$$\sin\left(2\pi f_2 t - \left[\arctan\left(\frac{V_{sin}}{V_{cos}}\right)\right]\right) \quad (2)$$

where A is an unknown amplitude term that depends on the sensor design and the separation between the target 3 and the sensor board 8, d is the position of the target along the length ($L_x$) of the sensor board 8; and f is the excitation frequency of the AC signals 31 and 33 and:

$$V_{cos} = A_0 \cos\left[\frac{2\pi d}{L_x}\right] \quad (3)$$

$$V_{sin} = A_0 \sin\left[\frac{2\pi d}{L_x}\right] \quad (4)$$

Consequently, the phase of the signal $64^{-1}$ output from the amplifier 34 will vary with the position of the target 3 in the manner illustrated in FIG. 5B. Therefore, the signal from the amplifier 34 is input to a phase detector 56, which compares the phase of the amplified signal $64^{-1}$ with the phase of the excitation signal $31^{-1}$, which is used as the reference phase. The measured phase is then output for display on the display to indicate the position of the target 44. Instead or in addition, the determined position information may be recorded or used to control some positioning system which moves the target 3 in a desired manner.

Phase Offsets

Figure 7A:
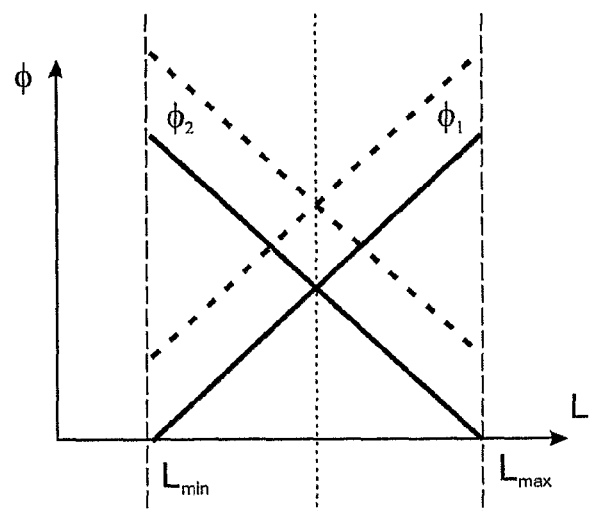
FIG. 7A is a phase plot illustrating the way in which two phase measurements obtained using the detection circuitry illustrated in FIG. 6 vary with the position of the moveable target.
Figure 7B:
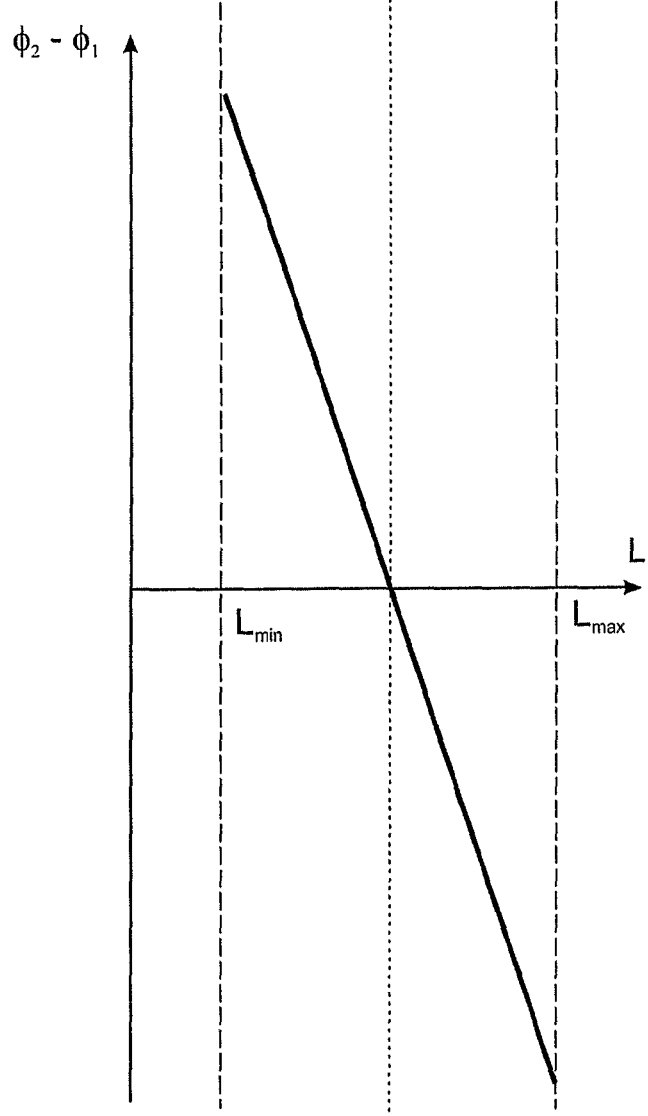
FIG. 7B is a phase plot illustrating the way in which a phase measurement obtained by combining the two phase measurements illustrated in FIG. 7A varies with the position of the moveable target.

As those skilled in the art will appreciate, the amplifier 34, the filter 68 and the phase detector 56 will all introduce a phase offset into the measurements that will vary depending on the operating conditions (eg temperature). These phase offsets will introduce an error into the determined position. In order to address this problem, the excitation circuitry 24 is controlled by a controller 59 so that it operates in alternating modes and the phase measurements obtained in the different modes are combined to remove the phase offsets whilst leaving a phase measurement that still varies with the position of the target 3. In particular, in a first mode the controller 59 controls the phase shifter 52 so that it applies the +90° phase shift 90 during a first time interval and in a second mode the controller 59 controls the phase shifter 52 so that it applies the −90° phase shift during a second time interval. As a result of this phase shift applied to the excitation signal, the phases measured by the phase detector 56 will vary in different ways in the two modes, in the manner illustrated in FIG. 7A. In particular, during the first mode, the measured phase $\phi_1$ will vary from a lower phase value at Lmin to an upper phase value at Lmax and during the second mode the measured phase $\phi_2$ will vary from the upper phase value at Lmin to the lower phase value at Lmax. Both measurements will, however, be subject to the same phase offsets due to the amplifier 34, the filter 68 and the phase detector 56, which are illustrated in FIG. 7A by the dashed lines. Therefore, by subtracting the phase measurements obtained in these two intervals, the common phase offsets will be cancelled leaving a single phase measurement that varies with the position of the target 3 in the manner illustrated in FIG. 7B.

Update Rate

Ideally, the controller 59 will control the two modes so that the phase measurements can be updated as quickly as possible—preferably once every period of the excitation signal 31. However, this causes some difficulty as the phase offsets introduced by the circuit components will also depend on time. In particular, when the controller 59 switches from the first mode to the second mode, it takes a finite time for the filter 68 to settle to the change in the input signal. During this settling period, the phase offsets will be changing and will settle down perhaps only after many cycles of the excitation signal. This problem can be addressed by waiting for the filter 68 to settle down, so that the phase offsets are not time varying. However, this will reduce the rate at which the phase measurements can be updated.

The inventor has realised that this problem can be overcome in a different way which will allow the phase measurements to be made once every period of the excitation signal. In particular, the inventor has realised that he can vary the start phase of the excitation signals applied during the two modes so that the "zero crossing" of the detected signal (represented by equation (2)) is at approximately the same time within each of the first and second intervals. This in effect ensures that the phase offsets will be at a similar level. Therefore, provided the phase measurements are made at the same point in the two intervals the phase offsets will substantially cancel each other out when the two phase measurements are subtracted from each other. This technique therefore allows phase measurements to be made once every period of the excitation signals.

Figure 8:
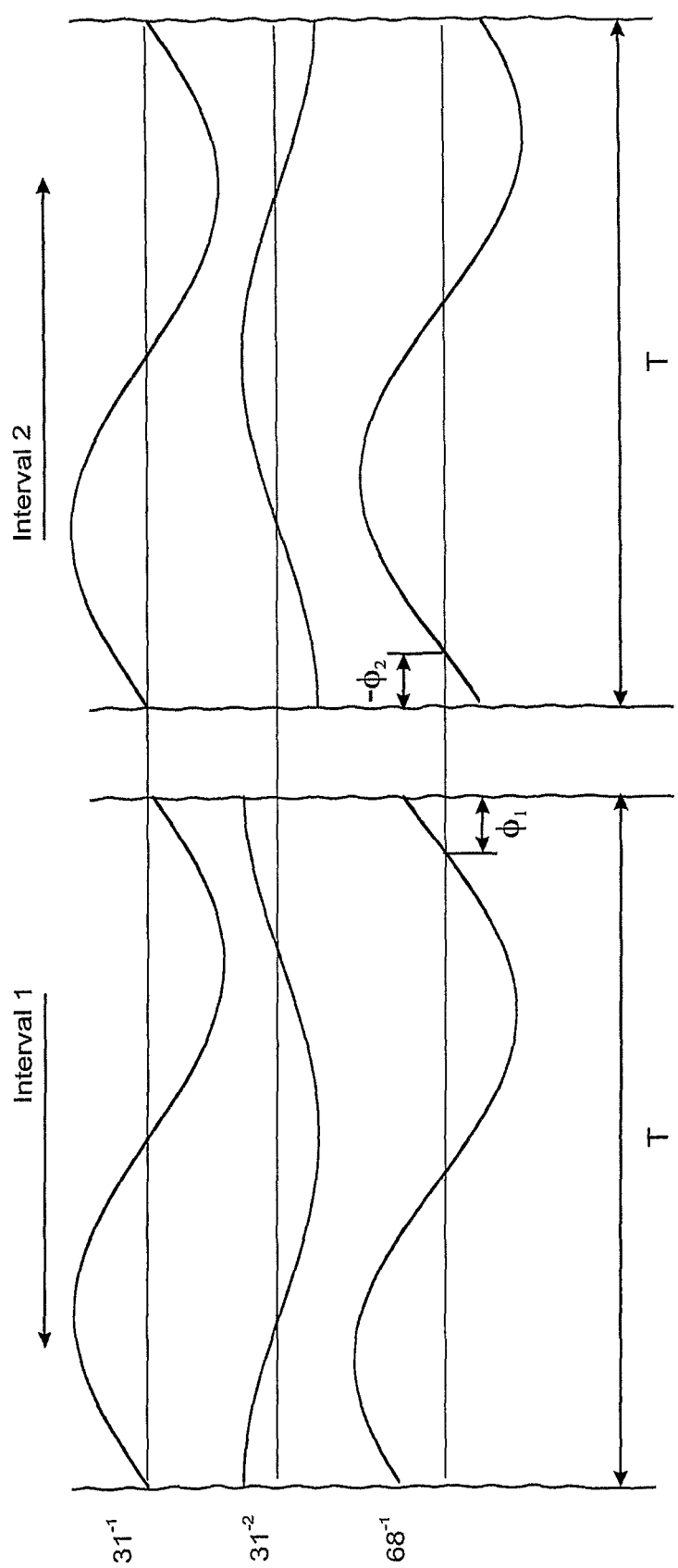
FIG. 8 illustrates a number of signals derived from the sensor windings during first and second sensing intervals and illustrating a phase difference between two of those signals.
Figure 9:
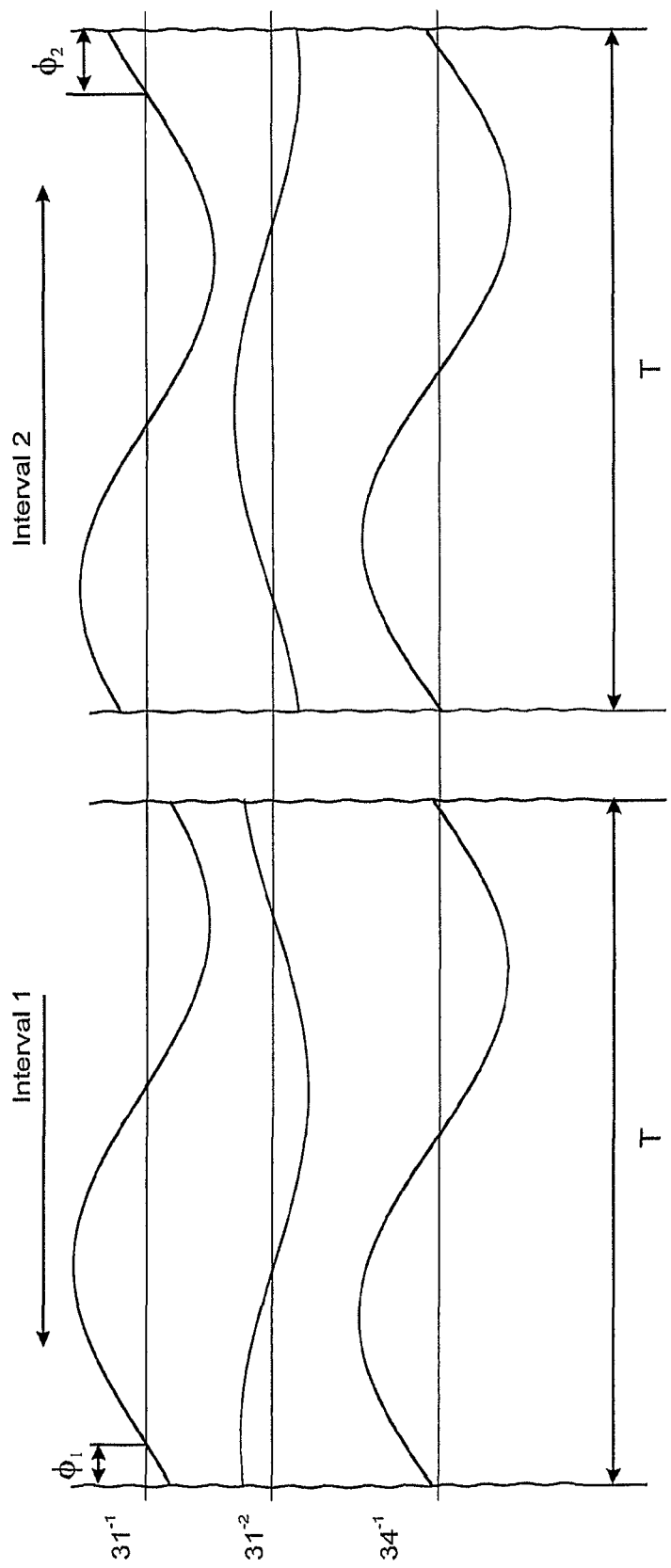
FIG. 9 illustrates the same signals shown in FIG. 8, except with different starting phases.

The way in which this is achieved will now be described in more detail with reference to FIGS. 8 and 9. FIG. 8 illustrates in the top plot the part of the detected signal caused by applying the excitation signal $31^{-1}$ to the excitation winding 15; in the middle plot the part of the detected signal caused by applying the excitation signal $31^{-2}$ to the excitation winding 14; and in the lower plot the filtered signal output from the low pass filter 68. As can be seen, the amplitudes of the signals in the upper two plots are different—this is because of the different coupling factors between the target 3 and each excitation winding. Also, as can be seen, during the second interval, the phase of the signal in the middle plot is reversed. This is because of the change of phase applied by the phase shifter 52 between the first and second intervals. The phase detector 56 measures the phase of the signal shown in the lower plot by comparing the time when it passes through a reference level compared with the time when the reference excitation signal passes through the same level, for example ground. As can be seen in FIG. 8, during the first interval, the positive going zero crossing occurs towards the end of the interval, whereas during the second interval, as a result of the change in phase of one of the excitation signals, the positive going zero crossing occurs at the start of the interval. Therefore, as these zero crossings happen at different times within the intervals, they will be subject to different phase offsets introduced by the amplifier 34, filter 68 and phase detector 56.

Consequently, and as mentioned above, in this embodiment, the controller 59 controls the signal generator 30 in order to control the start phase of the excitation signal $31^1$ during the two intervals so that the detected signal in each interval crosses the reference level at the same time within each interval. In this embodiment, the controller 59 changes the start phase so that the positive going zero crossing occurs close to the end of the interval. It does this by measuring the phases $\phi_1$ and $\phi_2$ shown in FIG. 8 and by using these as starting phases for the excitation signal 31-1 at the start of the corresponding measurement interval. The result is shown in FIG. 9. As can be seen from FIG. 9, the positive going zero crossing in both interval one and interval two occur close to the end of each interval. Therefore, by making the phase measurements at the same time within the respective intervals, the time varying phase offsets will be at about the same level and so will substantially cancel each other out when the phase difference is determined by the phase detector 56.

Of course, as the target 3 moves relative to the sensor board 8, the phase of the detected signals will change, but by using the measured phases of $\phi_1$ and $\phi_2$ each time to update the start phase of the excitation signal to be applied at the next measurement, the system can track the changes and ensure that the zero crossings occur at or near the desired point within each measurement interval. Thus the controller 59 operates by switching between the first mode and the second mode, with the measured phase obtained in a current first mode measurement interval being used to update the start phase that will be used in a subsequent (eg the next) first mode measurement interval; and with the measured phase obtained in a current second mode measurement interval being used to update the start phase that will be used in a subsequent (eg the next) second mode measurement interval. With this arrangement, the phase detector can update its phase measurements every period (T) of the excitation signal.

Excitation And Detection Circuitry—2

Figure 10:
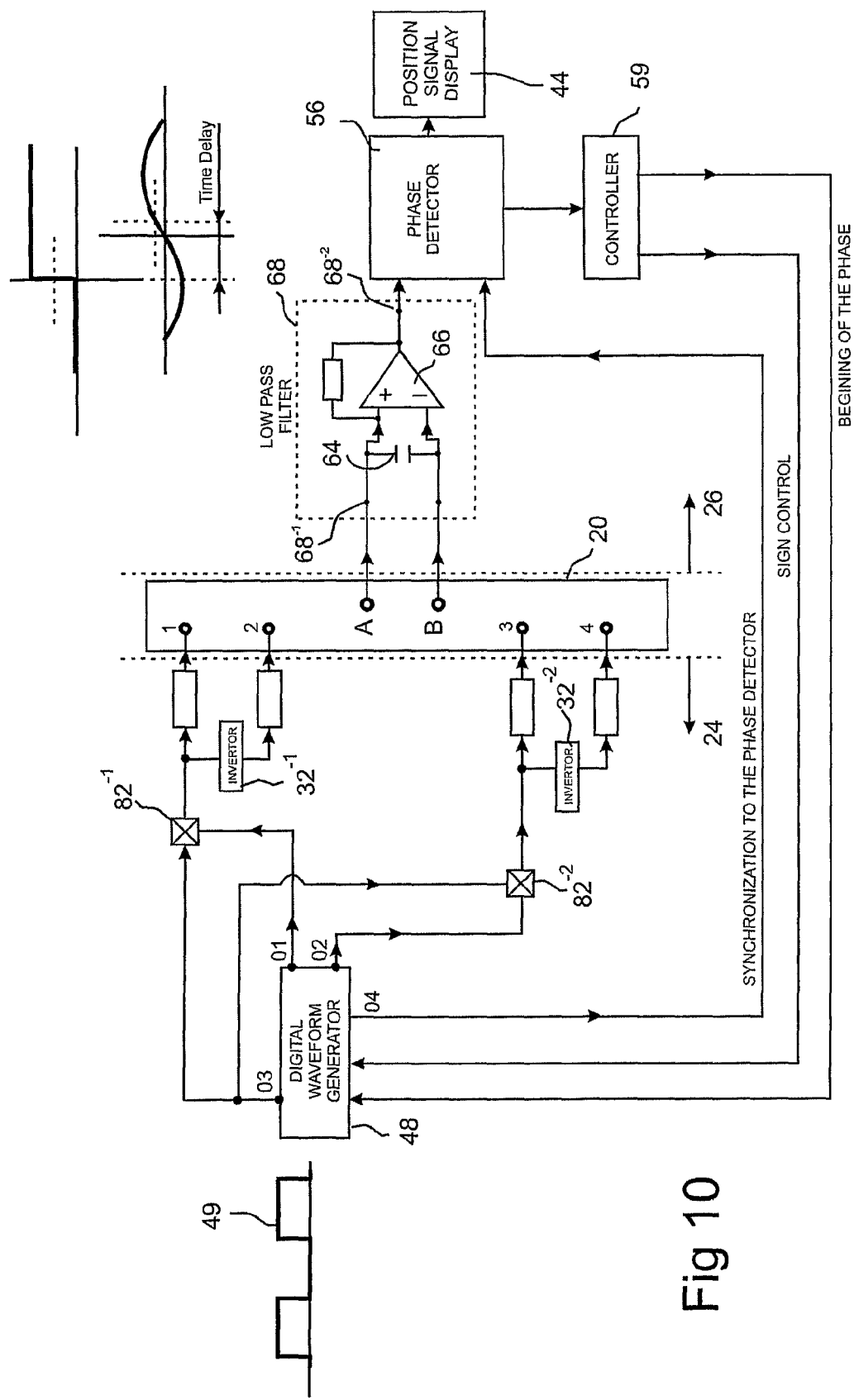
FIG. 10 is a block diagram illustrating the main components of alternative excitation and detection circuitry that can be used with the sensor shown in FIG. 1.
Figure 11:
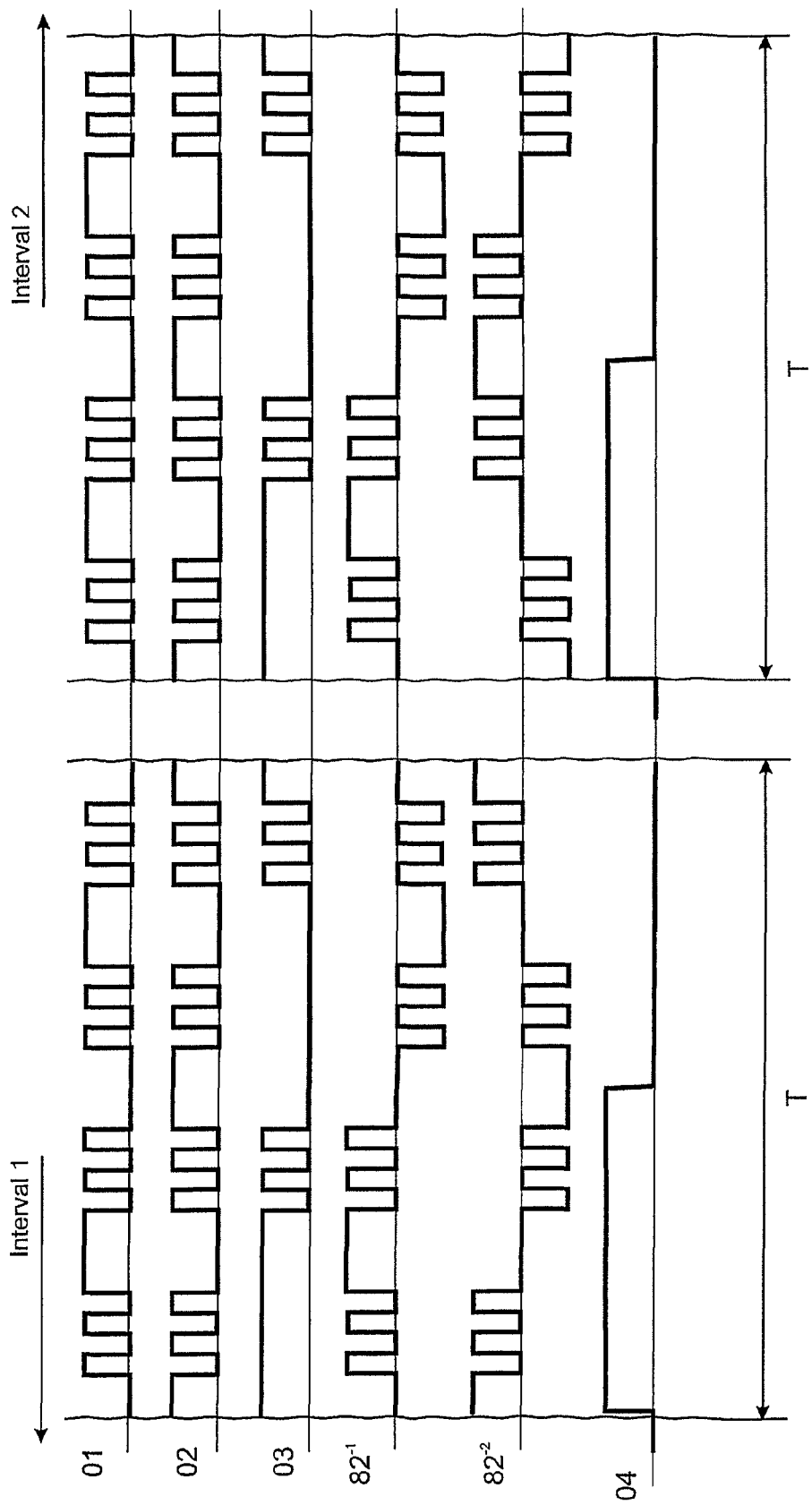
FIG. 11 illustrates a number of signals generated by a waveform generator forming part of the circuitry shown in FIG. 10.

FIG. 10 is a block diagram illustrating alternative excitation circuitry 24 and detection circuitry 26 that can be used. As discussed above, the sensor can operate over a range of frequencies. However, instead of using AC excitation signals 31 and 33, it is possible to use a digital waveform generator 48 (such as a ROM) which outputs digital signals at a timing defined by an applied clock signal 49. As shown, in this embodiment, the digital waveform generator 48 generates four signals labelled 01, 02, 03 and 04 which are illustrated in FIG. 11. As shown, signals 01 and 02 are two level signals which are periodic (with period T) and signal 02 is phase shifted by a quarter of the period relative to signal 01. Signal 03 is a control signal which is used to convert the two level signals 01 and 02 into three level signals that are sinusoidal in nature using the mixers $82^{-1}$ and $82^{-2}$. In particular, the mixer $82^{-1}$ operates such that when signal 01 is at logic low, the output from the mixer $82^{-1}$ will be zero; when signal 01 is at a logic high and signal 03 is at a logic high, then the output from the mixer $82^{-1}$ will be V; and when signal 01 is at a logic high and signal 03 is at a logic low, then the output from the mixer $82^{-1}$ will be –V. A similar mixing process is performed by the mixer $82^{-2}$ for signal 02. The result of this mixing process results in the three level sinusoidal signals also illustrated in FIG. 11, which are 90° out of phase with each other. As shown in FIG. 10, these digitally generated sinusoidal signals are then applied to the excitation windings 14 and 15 via terminals 1, 2, 3 and 4 as before in place of the AC excitation signals of the first embodiment. The fourth signal 04 generated by the digital waveform generator 48 is a square wave signal that has the same period as the signals 01 and 02 and is used to provide synchronisation for the phase detector 56.

Figure 12:
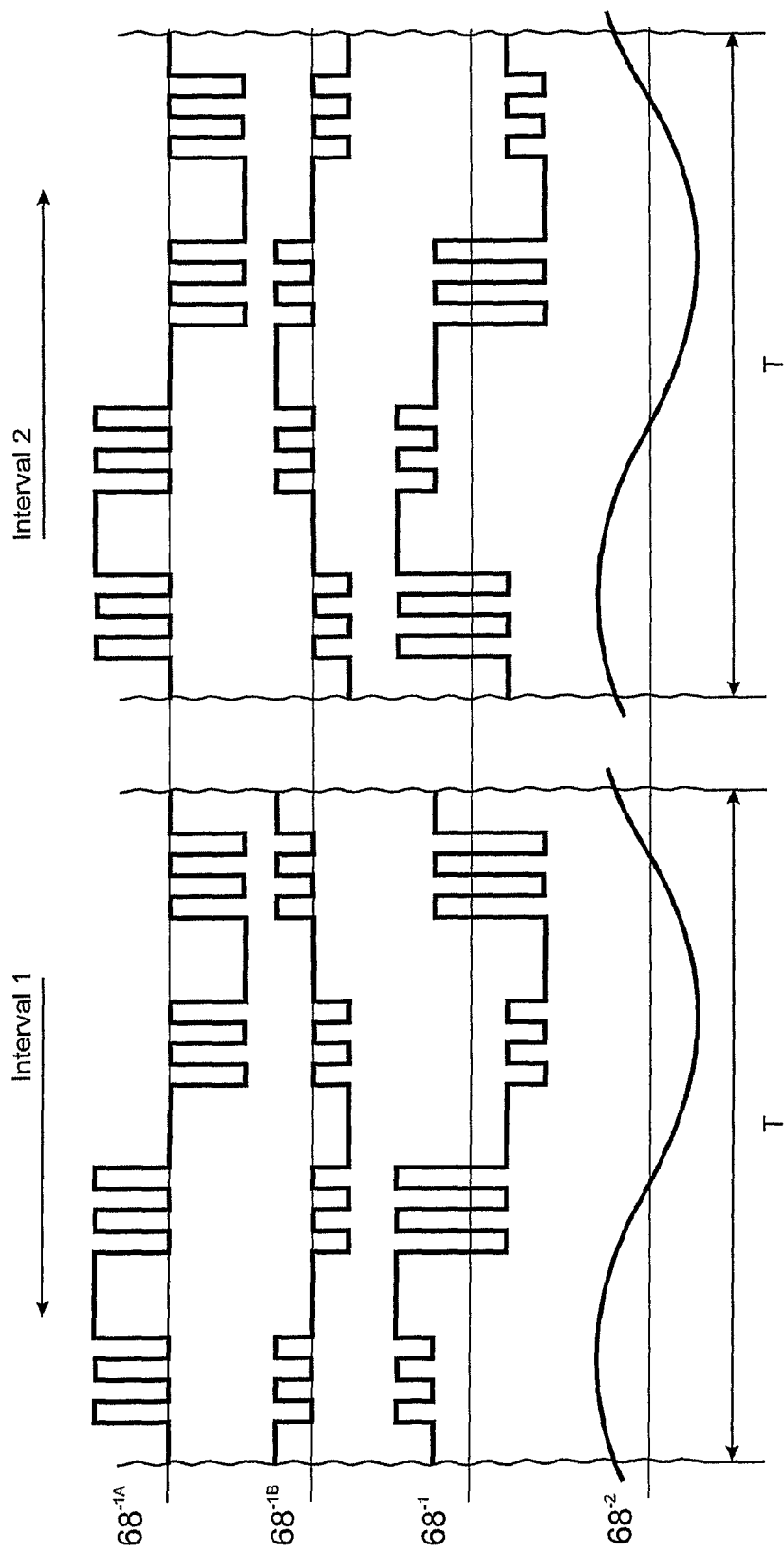
FIG. 12 illustrates a number of signals at different parts of the detection circuitry illustrated in FIG. 10.
Figure 13:
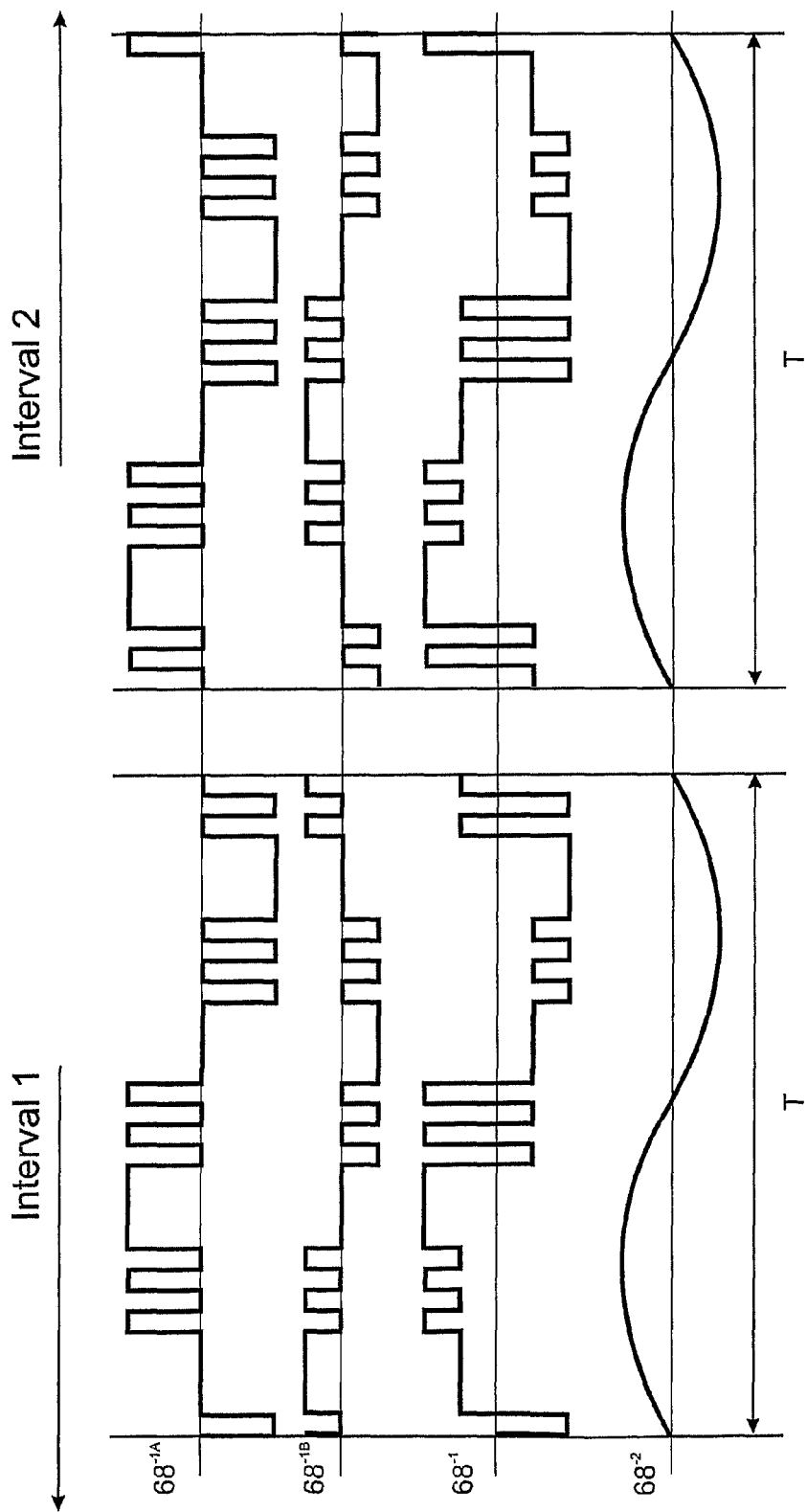
FIG. 13 illustrates the same signals shown in FIG. 12, except with different starting phases.

On the detection side, the same detection circuitry as is used in the first embodiment could be used. However, in this embodiment, the differential amplifier 66 is made part of the low pass filter 68 which also includes a reference capacitor 64 connected across its input terminals. FIG. 12 illustrates in the upper plot the part (labelled $68^{-1.4}$) of the detected signal caused by applying the excitation signal $82^{-1}$ to excitation winding 15; in the second plot the part (labelled $68^{-1.4}$) of the detected signal caused by applying the excitation signal 82' to excitation winding 14; and in the third plot (labelled $68^{-1}$) the resulting detected signal obtained by the superposition of these two parts. FIG. 12 also shows the resulting sinusoidal signal (labelled $68^{-2}$) obtained at the output of the low pass filter 68 once all the high frequency components have been removed. The subsequent processing of the filtered signal by the phase detector 56 is the same as in the first embodiment. The controller 59 also operates in the same way as in the first embodiment. FIG. 13 illustrates the same signals shown in FIG. 12 after the appropriate start phase has been determined and fed back by the controller 59 to the digital waveform generator 48. In this embodiment, when the controller applies the sign control signal to the digital waveform generator 48, to signal the switch to the second mode described above, the digital waveform generator 48 shifts the phase of the control signal 03 by a quarter of the period (in addition to the phase shift required by the defined start phase). This ensures that during the second interval, the excitation signal applied to excitation winding 14 is inverted compared with its polarity during the first interval. The format of the control signals 01, 02 and 03 have been chosen so that this change of phase of control signal 03 will not affect the polarity of the signal applied to excitation winding 15, although it will change the polarity of the excitation signal applied to excitation winding 14.

Excitation and Detection Circuitry—3

Figure 14:
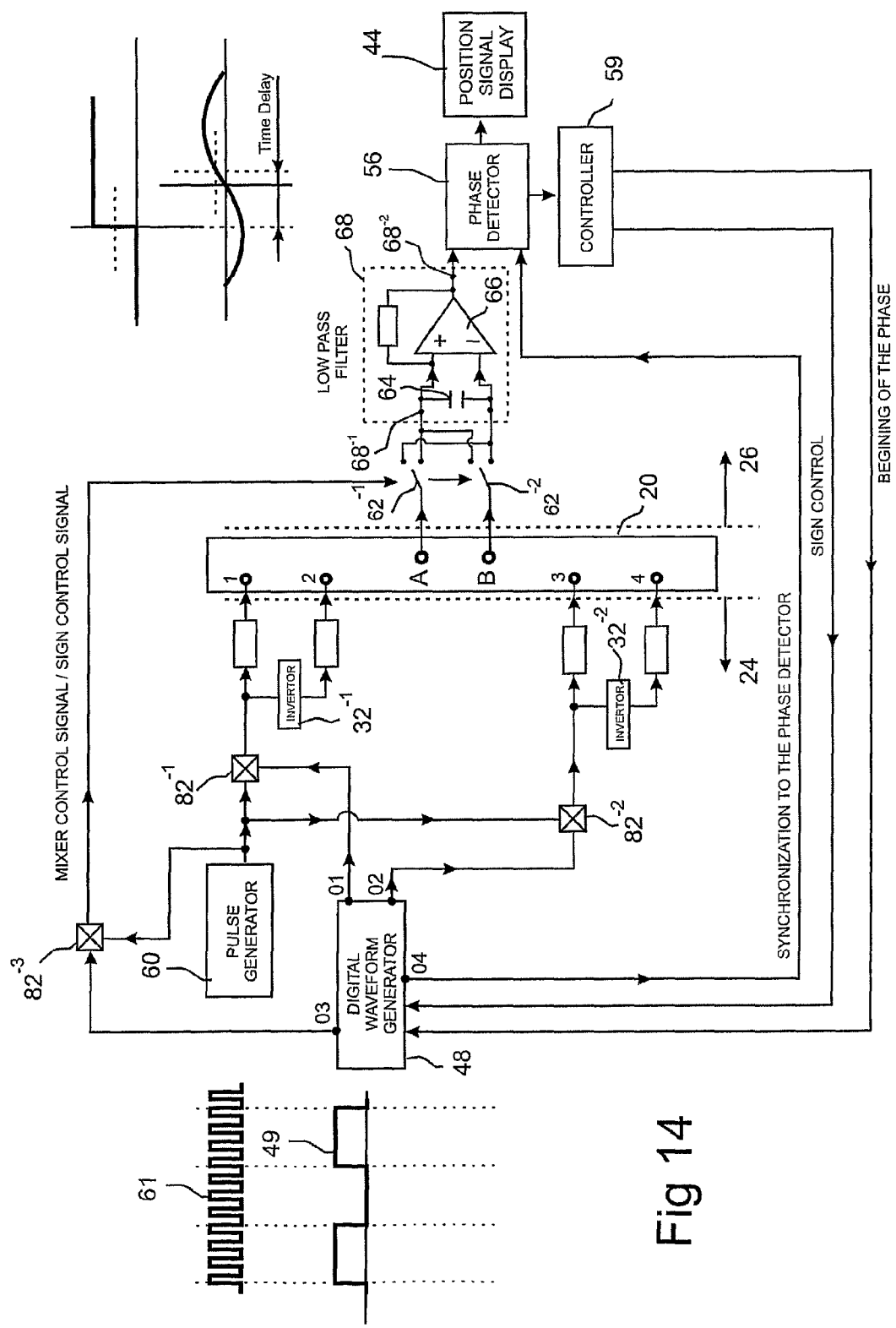
FIG. 14 is a block diagram illustrating the main components of alternative excitation and detection circuitry that can be used with the sensor shown in FIG. 1.

In both the above embodiments, the phase detector 56 operates to measure the phase of a signal at the excitation frequency. As those skilled in the art will appreciate, the accuracy with which the phase detector 56 can measure phase depends upon the frequency of the excitation signal that is used, with higher accuracy being achieved with lower frequencies. However, lower excitation frequencies can result in lower signal to noise levels. This problem can be overcome by using two different frequencies—a high frequency carrier signal and a lower frequency modulating signal. One way that this can be achieved is illustrated in FIG. 14, which is based on the second embodiment described above.

As shown, the excitation circuitry 24 also includes a pulse generator 60 which is arranged to generate a high frequency pulse train 61 which has a frequency many times that of the lower frequency clock signal 49 used to clock the digital waveform generator 48. Depending on the application, the frequency of the clock signal 49 may be between 1 kHz and 1 MHz. In this embodiment, the frequency of the clock 49 is 125 kHz and the frequency of the high frequency signal is 4 MHz-32 times that of the clock 49.

Figure 15:
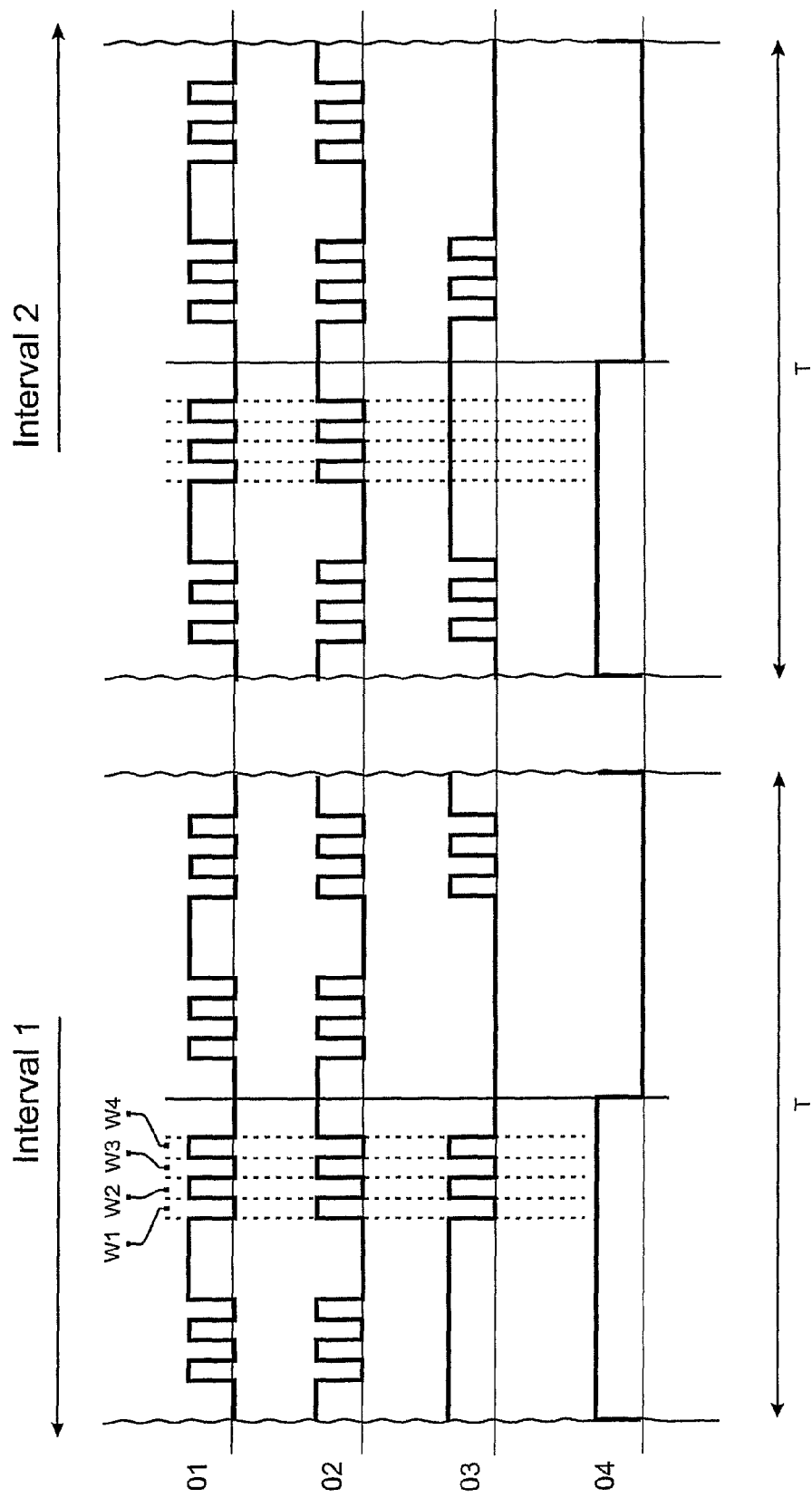
FIG. 15 illustrates a number of signals generated by a waveform generator forming part of the circuitry shown in FIG. 14.
Figure 16:
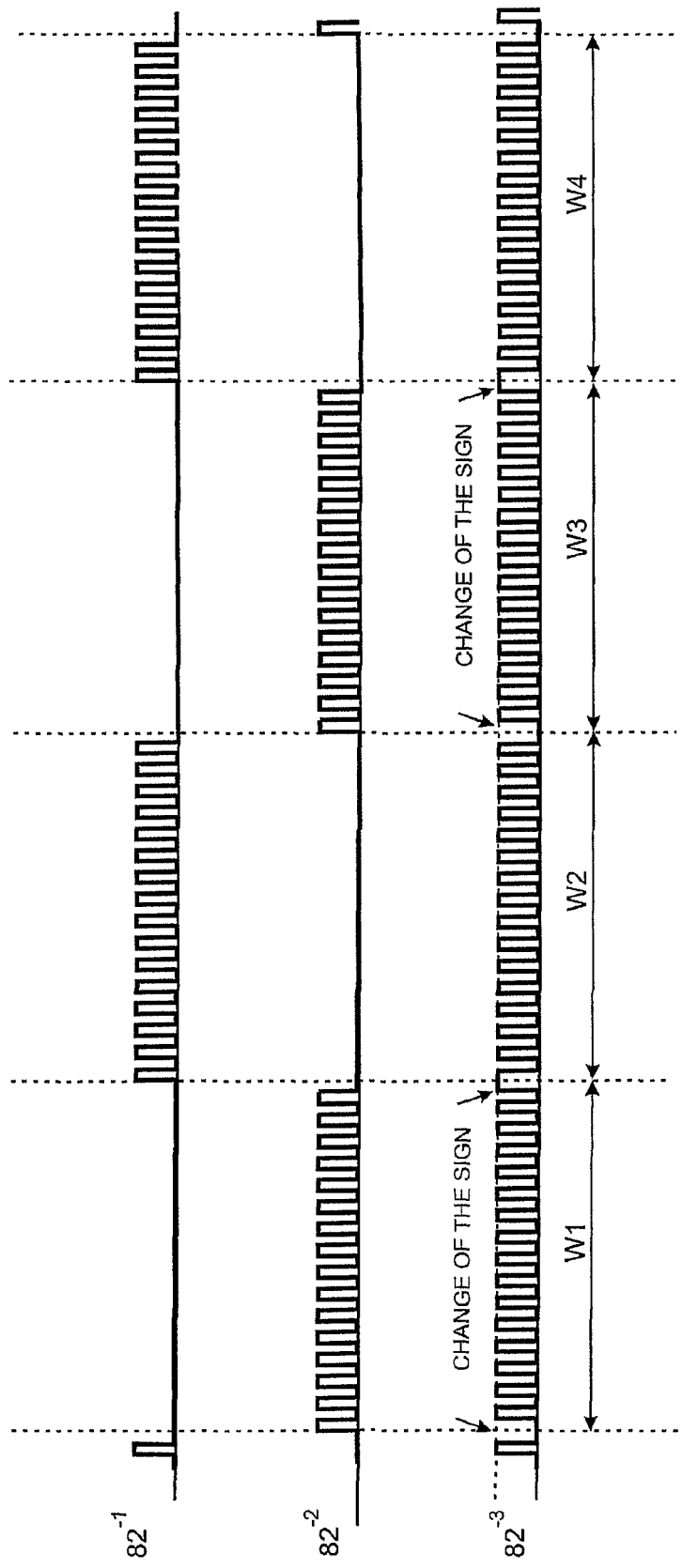
FIG. 16 illustrates a number of signals at different parts of the excitation circuitry illustrated in FIG. 14.

FIG. 15 illustrates the digital signals 01, 02, 03 and 04 generated by the digital waveform generator 48. As shown, they are the same as those generated in the second embodiment. However, in this embodiment, these signals are used in a slightly different manner. In particular, in this embodiment, the signals 01 and 02 are used to control mixers $82^{-1}$ and $82^{-2}$ respectively. The other input to these mixers 82 is the high frequency pulse train 61 generated by the pulse generator 60. The mixer $82^{-1}$ operates such that when signal 01 is at a logic low, no signal is output from the mixer $82^{-1}$ and when signal 01 is at a logic high, the high frequency pulse train 61 is allowed to pass through the mixer $82^{-1}$. As shown, the signal output from the mixer $82^{-1}$ is then applied to the excitation winding 15 via terminals 1 and 2 of the connection interface 20 as before. The mixer $82^{-2}$ operates in the same way and is controlled by signal 02, which is 90° phase shifted relative to signal 01. FIG. 16 illustrates in the upper two plots the signals at the output of the modulators 82, during the windows W1 to W4 illustrated in FIG. 15. As those skilled in the art will appreciate, the control signals 01 and 02 have been chosen so that they are not both at a logic high at the same time. In this way the excitation signal is applied to the two excitation windings 14 and 15 in a time division multiplex manner.

In the second embodiment described above the control signal 03 was used to convert the two level control signals into three level digital sinusoidal signals, by inverting the polarity of some of the voltage pulses. In this embodiment, this polarity reversal is still controlled by the control signal 03 but, as will be described in more detail below, is performed on the detection side of the electronics. As shown in FIG. 14, the control signal 03 is applied together with the high frequency pulse signal 61 to the mixer $82^{-3}$. The mixer $82^{-3}$ operates to change the phase of the high frequency pulse signal 61 by 180°, each time the control signal 03 changes from a logic low to a logic high or vice versa. The lower plot shown in FIG. 16 illustrates the resulting signal output from the mixer $82^{-3}$ during the four windows W1 to W4 shown in FIG. 15.

Figure 17:
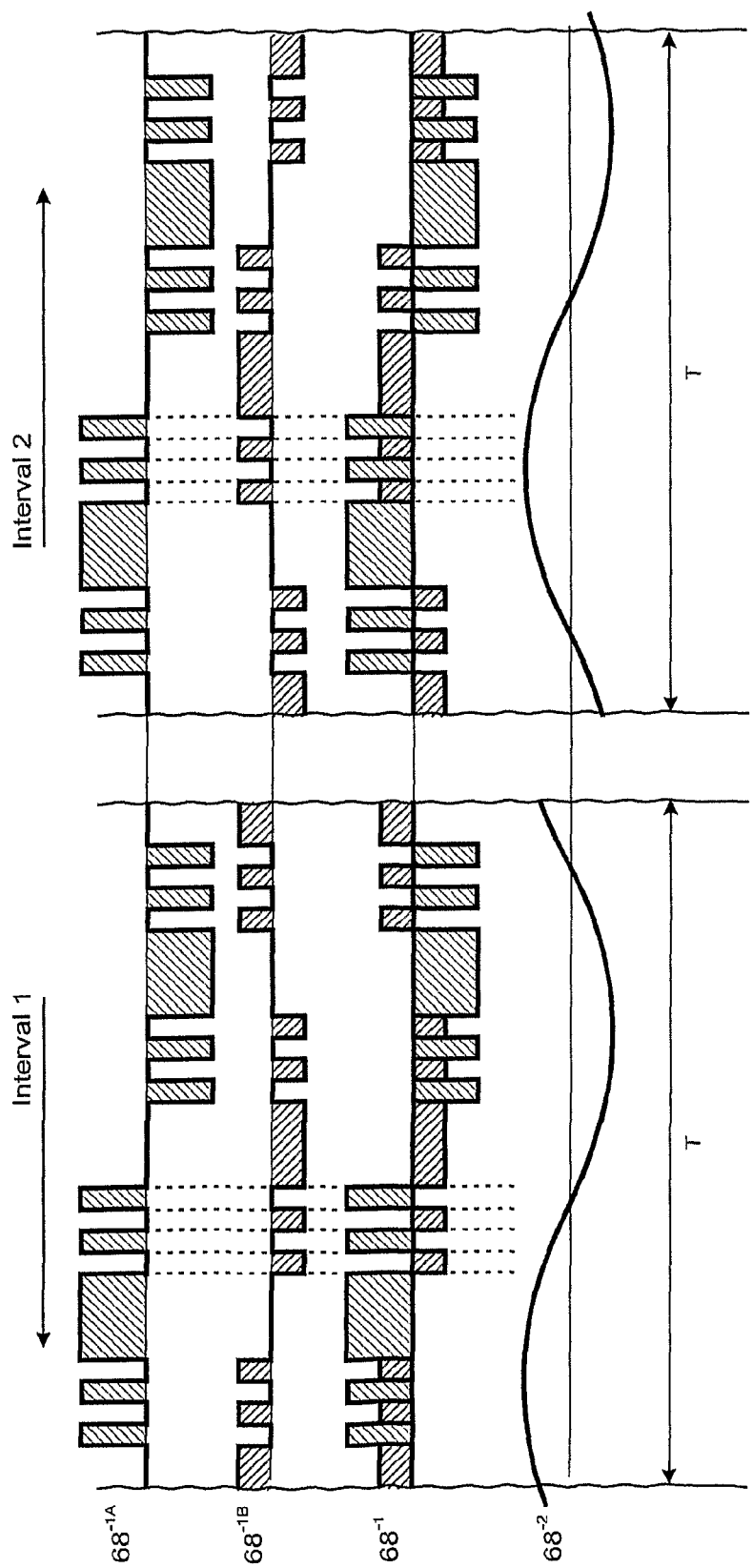
FIG. 17 illustrates a number of signals at different parts of the excitation circuitry illustrated in FIG. 14.
Figure 18:
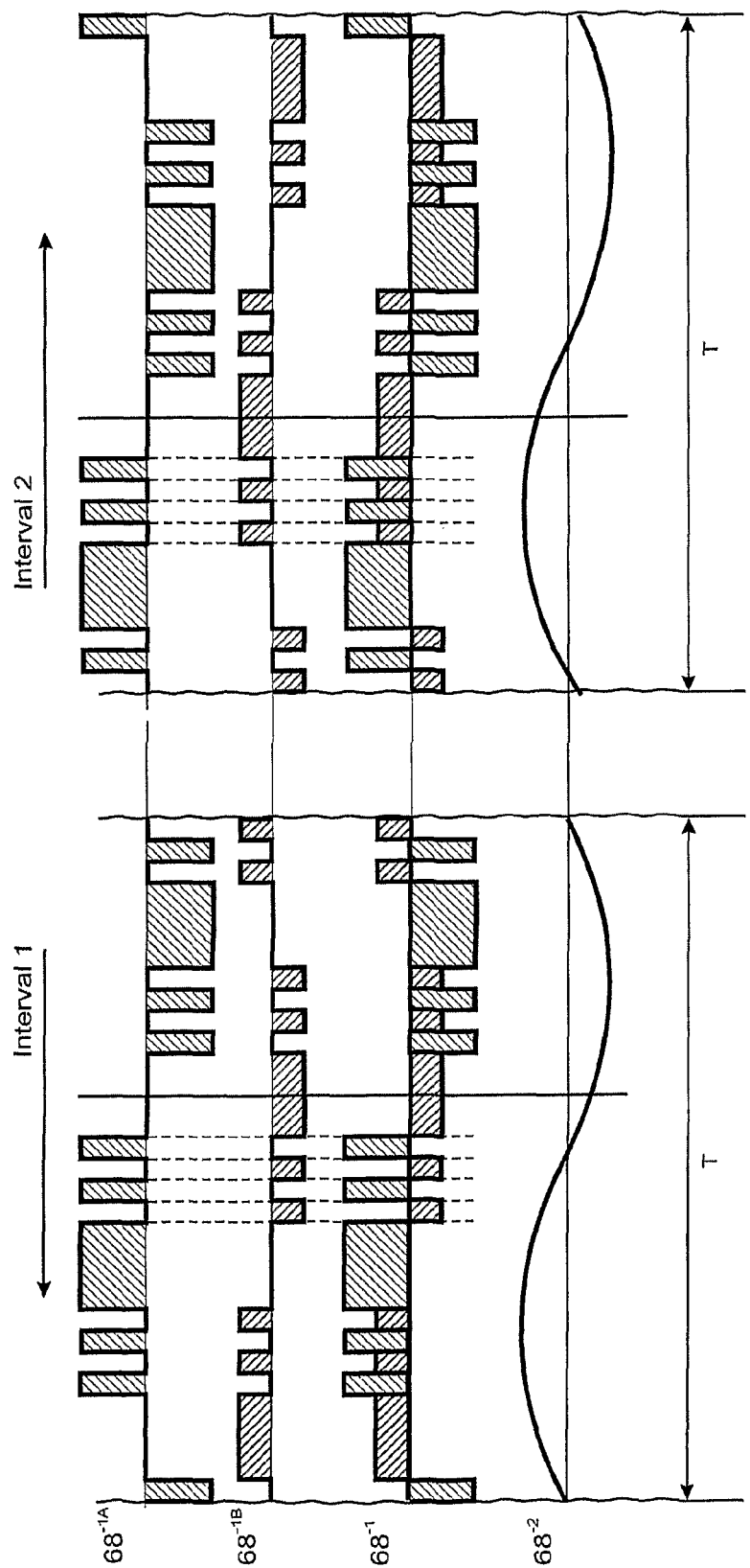
FIG. 18 illustrates the same signals shown in FIG. 17, except with different starting phases.

As shown in FIG. 14, the control signal output from mixer $82^{-3}$ is used to control the switching of switches $62^{-1}$ and $62^{-2}$, which are connected to terminals A and B of the connection interface 20. As shown in FIG. 14, these switches operate to invert the signal appearing across terminals A and B of the connection interface. The positions of these switches 62 are changed on the rising and falling edges of each pulse. The switches 62 therefore operate to down convert the high frequency component of the excitation signals (the component corresponding to the high frequency pulse train 61) to leave the lower frequency components (corresponding to control signals 01 and 02) which are themselves modulated by $V_{cos}$ and $V_{sin}$ as before. Further, because of the changes of phase of the pulse train used to control the switches 62, the two level control signals 01 and 02 are effectively converted into three level sinusoidal signals in a similar manner to the second embodiment described above. This is illustrated in FIG. 17, which shows, in the first plot, the part of the detected signal (labelled $68^{-1,4}$) after the switches 62 that results from the application of the excitation signal to excitation winding 15; in the second plot, the part of the detected signal (labelled $68^{-1B}$) after the switches 62 that results from the application of the excitation signal to excitation winding 14; and in the third plot, the detected signal (labelled $68^{-1}$) after the switches 62 that results from the application of both excitation signals to the two excitation windings 14 and 15. The signals illustrated in FIG. 17 are shaded, as these signals will also include high frequency components caused by the switching action of the switches 62. However, these high frequency components and other high frequency components are filtered out by the low pass filter 68 to leave the sinusoidal signal 68-2 illustrated in FIG. 17, whose phase varies with the position of the target being measured. The remaining processing of the filtered signal is then similar to the previous embodiment and so a detailed description will not be given. However, FIG. 18 illustrates the signals shown in FIG. 17 after the appropriate start phase has been determined by the controller 59 and fed back to the digital waveform generator 48. As shown, by applying the appropriate start phases to the control signals 01, 02 and 03, the positive going zero crossing can be made to occur at the desired point within both measurement intervals, so that the changing phase offsets can be removed when the above phase difference calculation is determined.

Excitation And Detection Circuitry—4

In the systems described above, the excitation signals were applied to the two ends of the excitation windings 14 and 15 shown in FIG. 1 and the signals obtained from the sensor winding 13 were connected to the detection circuitry 26. In an alternative sensor design the roles of these windings can be reversed so that the windings 14 and 15 are connected to the detection circuitry 26 and the winding 13 is connected to the excitation circuitry 24. This is illustrated schematically in the electrical equivalent circuit shown in FIG. 19. As those skilled in the art will appreciate, with such an arrangement, the two parts of the detection signal described above will be induced in the two different windings 14 and 15 and then combined in detection circuitry to generate the signal defined by equation (2), whose phase varies with the position to be measured.

FIG. 20 is a block diagram illustrating the excitation circuitry 24 and the detection circuitry 26 that can be used in such an "inverted" system. As shown, the excitation circuitry 24 is based on the excitation circuitry 24 used in the second embodiment in that it uses the digital waveform generator 48 to generate the excitation signal which is applied to the excitation winding 13 via terminals A and B. Although, as those skilled in the art will appreciate, the analogue circuitry of the first embodiment could of course be used instead. As shown, in this embodiment, the same digital waveform generator 48 is provided in this embodiment, which generates the same control signals 01, 03 and 04 as before. The control signal 02 is not needed as in this embodiment, there is one less excitation winding. In this embodiment, the control signal 03 is used as the excitation signal and the control signal 01 is used to control the multiplexing of the signals induced in the windings 14 and 15 to the low pass filter 68 through the multiplexing switches $76^{-1}$ and $76^{-2}$. With this arrangement, the signal output by the multiplexor 76 will have the same form as the signal shown in the plot labelled $68^{-1}$ in FIG. 12. The low pass filter 68 will therefore remove the high frequency components of this signal to leave the low frequency sinusoid whose phase varies with the position of the target 3. The remaining operations of the phase detector 56 and of the controller 59 are the same as in the previous embodiments and will not be described again.

Excitation And Detection Circuitry—5

FIG. 21 is a block diagram illustrating the form of alternative excitation and detection circuitry that may be used with this inverted sensor design. In this embodiment, the high frequency pulse train 61 is used to excite the excitation winding 13. As shown, in this embodiment, the control signals generated by the digital waveform generator 48 are used to control the operation of the detection circuitry 26. In particular, the control signal 01 is again used to control the multiplexing of the signals from the two sensor windings 14 and 15 towards the low pass filter 68. However, as shown the signal from the multiplexor 76 is first applied to a set of inverting switches $62^{-1}$ and $62^{-2}$ which are controlled by a mixer control and sign control signal output from the mixer $82^{-3}$. This control signal is generated in the same way and has the same form as the control signal illustrated in the plot labelled $82^{-3}$ shown in FIG. 16. The switches 62 therefore act to down convert (demodulate) the high frequency excitation signal to leave the lower frequency components which are themselves modulated by $V_{cos}$ and $V_{sin}$ as before. Further, because of the changes of phase of the pulse train used to control the switches 62, the desired sinusoidal signals are obtained in a similar manner to the third embodiment described above. The signal input towards the low pass filter 68 will therefore have the same form as the signal illustrated in the plot labelled $68^{-1}$ shown in FIG. 17. This signal is then filtered and processed as before.

Modifications and Other Alternatives

A number of embodiments have been described above that illustrate different forms of excitation and detection circuitry that can be used with the general form of sensor windings illustrated in FIG. 1. As those skilled in the art will appreciate, a number of modifications and alternatives can be made to the above embodiments and some of these will now be described.

The excitation and detection circuitry described above were for use with the inductive based excitation and sensor windings illustrated in FIG. 1. As those skilled in the art will appreciate, the same or similar circuitry could be used with other sensor designs and with sensors operating under different principles, such as capacitive sensors. Examples of capacitive sensor designs can be found in the above mentioned prior applications WO2005/111551, WO2006/123141 or U.S. Pat. No. 6,823,731. Similarly, it is not essential that the windings or capacitive plates used are defined by conductors on a printed circuit board, they may be defined by any appropriate conductor.

In the above embodiments, the target moved relative to the sensor board. As those skilled in the art will appreciate, the sensor board may move as well as or instead of the target.

In the above embodiments, the target included a resonator that was energised by driving the or each excitation winding and a signal was generated in the or each sensor winding that varied with the position of the target relative to the sensor board. As those skilled in the art will appreciate, the use of such a resonator is not essential. Other electromagnetic devices may be used. For example, a short circuit coil, a metallic screen or a piece of ferrite may be used. In capacitive embodiments, the target may be a finger, other electrodes or liquid in a tank, where the level of the liquid is being sensed and the liquid itself affects the coupling between the excitation electrodes and the sensor electrodes. In another type of sensor, a DC magnet together with a film of magnetisable material (such as in the manner described in WO2005/085763) may be used instead of the resonator. In a further alternative, the or each excitation winding/electrode may be carried by the movable member and the or each sensor winding/electrode may be carried on the fixed member (or vice versa). The sensor could therefore be an LVDT type sensor. In this case, there is no need for a separate electromagnetic device on the target to interact with the excitation and sensor windings to produce the signals that vary with position. The disadvantage with this embodiment, however, is that it requires connectors to two parts.

In the first sensor design described above, the windings 14 and 15 were each formed from two turns of conductor. As those skilled in the art will appreciate, the use of two turn windings is not essential. Any number of turns may be provided. Preferably, as many turns as possible are provided in the space allowed by the dimensions of the PCB 8 as this maximises signal levels obtained from the windings.

Similarly, in the first sensor design described above, the winding 13 included a single turn of conductor. As those skilled in the art will appreciate, the number of turns of conductor for all of the windings can be varied in order to vary the reactive impedance of the windings to match the impedance of the appropriate output or input of the excitation and detection electronics.

In the above sensor designs, the position of the target determined by the detection electronics was displayed on a display. As those skilled in the art will appreciate, in alternative embodiments, the position information may be provided to another computer system for controlling another part of a system. For example, where the target forms part of an engine, the determined position may be supplied to an engine management unit which can use the position information to control, for example, the timing of ignition of the fuel mixture within the engine.

In the sensor designs described above, the windings 14 and 15 were formed in a figure of eight configuration. As those skilled in the art will appreciate, it is not essential to form these windings in such a figure of eight configuration. The only requirement of the windings/electrodes is that they are able to detect/generate an electromagnetic field which positionally varies along the measurement path. This can be achieved by a single winding/electrode positioned at a position along the measurement path. Alternatively, it can be achieved using a winding/electrode which geometrically varies along the measurement path. This geometrical variation may be its shape along the measurement path or its dimensions such as the thickness of the conductor forming the winding/electrode or the number of turns of the winding etc.

In the above sensor designs, the excitation and sensor windings were formed as conductor tracks on a printed circuit board. As those skilled in the art will appreciate the excitation and sensor windings may be formed using any conductive material, such as conductive inks which can be printed on an appropriate substrate or conductive wire wound in the appropriate manner. Additionally, it is not essential for the excitation winding and the sensor winding to be mounted on the same member. For example, two separate printed circuit boards may be provided, one carrying the excitation winding and the other carrying the or each sensor winding.

In the first sensor design described above, the excitation signal applied to the excitation winding was an AC signal at a particular frequency. As those skilled in the art will appreciate, it is not essential for the excitation signal to be AC. For example, the excitation signal may be any cyclically varying signal.

In the first sensor design described above, two phase quadrature excitation windings were provided. As those skilled in the art will appreciate, it is not essential to use windings that are in phase quadrature. For example, instead of using the winding 15, a second winding phase shifted by an eighth of the pitch along the measurement path may be used. However, as those skilled in the art will appreciate, the use of phase quadrature windings is preferred as this simplifies the processing to be performed by the detection circuitry to determine the position of the movable member. Additionally, as those skilled in the art will appreciate, in embodiments that use windings that provide signal levels that vary substantially sinusoidally with the position of the movable member, it is not essential to only use two quadrature windings. For example, three or four windings may be provided each separated along the measurement path by an appropriate distance (or angle in the case of a rotary position encoder).

In the first sensor design described above, an AC current (having a peak amplitude of approximately 20 mA) was applied to the excitation winding. As those skilled in the art will appreciate, the magnitude of the excitation current is preferably chosen depending on the position and layout of the excitation winding(s) relative to the target. Therefore, appropriate excitation current strengths may vary from 0.01 mA to 10 A.

In the above embodiments, the excitation and the detection circuits included various electronic hardware circuits. In an alternative embodiment, a programmable circuit (processor) controlled by software stored in a memory may implement these circuits. The software may be provided in any appropriate form and in any computer language. It may be supplied as a signal or stored on a computer readable medium such as a CD ROM.

In the above embodiments, complimentary excitation signals (180° out of phase with each other) were applied to each end of the or each excitation winding. As discussed above in the first sensor design, this is found to be advantageous as it allows the system to operate at higher excitation frequencies without suffering from unwanted capacitive coupling. However, as those skilled in the art will appreciate, it is not essential to apply excitation current to the excitation winding in this way. Instead, one end of the/or each excitation winding may be connected to a reference potential such as ground, with the other end being connected to receive the excitation signal.

In the above embodiments which employ digital circuitry for generating excitation signals and for generating control signals, two separate signal generators were used. As those skilled in the art will appreciate, a single signal generator may be used which generates both the high frequency pulse signal and the lower frequency control signals.

In the third embodiment described above, the excitation signals were generated by modulating a high frequency carrier signal with a lower frequency signal and the phase detector operated at the lower frequency. As those skilled in the art will appreciate, the same modulation techniques can be used in the first embodiment that used AC excitation signals. Additionally, as those skilled in the art will appreciate, different modulation techniques can be used, such as amplitude modulation, pulse width modulation etc.

In the above embodiments, a separate phase detector and controller were described. As those skilled in the art will appreciate, the functions of the phase detector and the controller may be performed by a single controller, such as by a microprocessor.

The invention claimed is:
1. An apparatus for use with a position sensor, the apparatus comprising:
 a signal generator configured to generate signals for driving the position sensor so that a cyclically varying sensor signal is obtained from the position sensor whose phase varies with the position to be sensed;

a controller configured to control the signal generator to switch between a first mode in which the phase of said sensor signal varies with said position according to a first function and a second mode in which the phase of said sensor signal varies with said position according to a second function that is different than said first function; and a phase detector configured: i) to determine a first phase measurement of said sensor signal during said first mode, said first phase measurement depending upon a time between a start of the first mode and when said sensor signal crosses a reference level; ii) to determine a second phase measurement of said sensor signal during said second mode, said second phase measurement depending upon a time between a start of the second mode and when said sensor signal crosses a reference level; iii) to obtain a difference between the first and second phase measurements to obtain a phase difference measurement; and iv) to output an indication of the position to be sensed determined using said phase difference measurement, wherein said controller is configured to control said signal generator in order to change a start phase of signals generated by said signal generator in at least one of said first and second modes so that the timings at which said sensor signal crosses said reference level relative to the corresponding start times of said first and second modes are substantially the same, and wherein said controller is configured to control said signal generator to switch repeatedly between said first and second modes and wherein said start phase of signals generated by said signal generator for a current first mode is based on a phase measurement obtained by said phase detector in a previous first mode.

2. An apparatus according to claim 1, wherein said signal generator is configured to generate excitation signals for exciting sensor elements of said position sensor and wherein said controller is configured to control the start phase of one or more of said excitation signals.

3. An apparatus according to claim 1, wherein said signal generator is configured to generate mixing control signals for controlling mixing switches of said position sensor and wherein said controller is configured to control the start phase of one or more of said mixing signals.

4. An apparatus according to claim 1, wherein said controller is configured to control said signal generator to switch repeatedly between said first and second modes and wherein said start phase used for a current second mode is based on a phase measurement obtained in a previous second mode.

5. An apparatus according to claim 1, wherein said signal generator is configured to generate AC signals.

6. An apparatus according to claim 1, wherein said signal generator is configured to generate digital signals for driving said position sensor.

7. An apparatus according to claim 1, wherein said signal generator is configured to generate one or more high frequency signals and one or more lower frequency signals and wherein said lower frequency signals are used to modulate the high frequency signals and wherein the high frequency modulated signals are used to excite sensor elements of said position sensor.

8. An apparatus according to claim 1, wherein said controller is configured to control the signal generator so that during said first mode the phase of said sensor signal varies with said position according to a first linear function and so that during said second mode the phase of said sensor signal varies with said position according to a second different linear function.

9. An apparatus according to claim 8, wherein said controller is configured to control the signal generator so that during said first mode the phase of said sensor signal varies with said position according to a linear function with a positive gradient and so that during said second mode the phase of said sensor signal varies with said position according to a linear function with a negative gradient.

10. An apparatus according to claim 1, wherein said phase detector is configured to difference said phase measurements by subtracting the second phase measurement from the first phase measurement.

11. An apparatus according to claim 1, wherein said phase detector is configured to determine said first and second phase measures by determining the time taken for the sensor signal to pass through a reference level from the start of the respective mode.

12. An apparatus according to claim 1, wherein said controller is configured to control said signal generator in order to set a start phase of signals generated in at least one of said first and second modes so that said sensor signal crosses said reference level towards the end of a period in which the signal generator is operating in said first or second modes.

13. An apparatus according to claim 1, wherein said controller is configured to switch between said first and second modes at a frequency corresponding to the cyclic variation of said sensor signal.

14. An apparatus according to claim 13, wherein the time between switching between said modes is a measurement interval and wherein said start phases are chosen so that said sensor signal crosses said reference level just before the end of the corresponding measurement interval.

15. An apparatus according to claim 14, wherein said start phases are chosen so that said sensor signal crosses said reference level between one tenth and one fiftieth of the measurement interval from the end of the corresponding measurement interval.

16. An apparatus according to claim 1, wherein said phase detector is configured to determine the position to be measured based on the determined phase difference measurement and the respective start phases applied during the respective modes.

17. A position sensor comprising position sensing elements for sensing position and an apparatus according to claim 1.

18. A position sensor according to claim 17, wherein said position sensor is an inductive or a capacitive based sensor.

19. A position sensor according to claim 17, comprising excitation elements and sensing elements.

20. A position sensor according to claim 19, wherein said excitation elements are for exciting a target device and wherein said sensing elements are for sensing a signal generated by said target device when excited by said excitation elements.

21. A position sensor according to claim 17, comprising mixing circuitry for mixing signals obtained from sensing elements of the position sensor, to generate a signal whose phase varies with the position to be sensed.

22. A position sensor according to claim 17, further comprising at least one of an amplifier and a low pass filter for processing the signals obtained from the position sensor prior to processing by said apparatus.

23. A non-transitory computer readable medium comprising computer implementable instructions for causing a programmable computer device to become configured as the apparatus of claim 1.

24. An apparatus for use with a position sensor, the apparatus comprising:
- a signal generator configured to generate signals for driving the position sensor so that a cyclically varying sensor signal is obtained from the position sensor whose phase varies with the position to be sensed;
- a controller configured to control the signal generator to switch between a first mode in which the phase of said sensor signal varies with said position according to a first function and a second mode in which the phase of said sensor signal varies with said position according to a second function that is different than said first function; and
- a phase detector configured: i) to determine a first phase measurement of said sensor signal during said first mode, said first phase measurement depends depending upon a time between a start of the first mode and when said sensor signal crosses a reference level; ii) to determine a second phase measurement of said sensor signal during said second mode, which said second phase measurement depending upon a time between a start of the second mode and when said sensor signal crosses a reference level; iii) to obtain a difference between the first and second phase measurements to obtain a phase difference measurement; and iv) to output an indication of the position to be sensed determined using said phase difference measurement,
- wherein said controller is configured to control said signal generator in order to change a start phase of signals generated by said signal generator in at least one of said first and second modes so that the timings at which said sensor signal crosses said reference level relative to the corresponding start times of said first and second modes are substantially the same,
- wherein said controller is configured to control the signal generator so that during said first mode the phase of said sensor signal varies with said position according to a first linear function and so that during said second mode the phase of said sensor signal varies with said position according to a second different linear function, and
- wherein said controller is configured to control the signal generator so that during said first mode the phase of said sensor signal varies with said position according to a linear function with a positive gradient and so that during said second mode the phase of said sensor signal varies with said position according to a linear function with a negative gradient.

* * * * *

UNITED STATES PATENT AND TRADEMARK OFFICE
CERTIFICATE OF CORRECTION

PATENT NO. : 8,710,827 B2  
APPLICATION NO. : 12/933203  
DATED : April 29, 2014  
INVENTOR(S) : Victor Evgenievich Zhitomirsky Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 754 days.

Signed and Sealed this

Twenty-ninth Day of September, 2015

Michelle K. Lee
*Director of the United States Patent and Trademark Office*